(12) United States Patent
Biswas et al.

(10) Patent No.: US 9,135,072 B2
(45) Date of Patent: Sep. 15, 2015

(54) QOS-AWARE SCHEDULING

(71) Applicant: Apple Inc., Cupertino, CA (US)

(72) Inventors: Sukalpa Biswas, Fremont, CA (US); Hao Chen, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 14/017,971

(22) Filed: Sep. 4, 2013

(65) Prior Publication Data

US 2014/0006743 A1   Jan. 2, 2014

Related U.S. Application Data

(63) Continuation of application No. 13/653,109, filed on Oct. 16, 2012, now Pat. No. 8,553,042, which is a continuation of application No. 12/883,864, filed on Sep. 16, 2010, now Pat. No. 8,314,807.

(51) Int. Cl.
  *G06F 13/12*   (2006.01)
  *G06F 13/38*   (2006.01)
  *G06F 13/00*   (2006.01)
  *G06F 9/50*    (2006.01)
  *G06F 13/16*   (2006.01)

(52) U.S. Cl.
  CPC .......... *G06F 9/5033* (2013.01); *G06F 13/1668* (2013.01)

(58) Field of Classification Search
  None
  See application file for complete search history.

(56) References Cited

U.S. PATENT DOCUMENTS

| 3,311,885 | A | 3/1967 | Propster, Jr. |
| 5,649,110 | A | 7/1997 | Ben-nun et al. |
| 5,742,772 | A | 4/1998 | Sreenan |
| 6,047,051 | A | 4/2000 | Ginzboorg et al. |
| 6,092,095 | A | 7/2000 | Maytal |
| 6,184,906 | B1 | 2/2001 | Wang et al. |
| 6,324,616 | B2 | 11/2001 | Chrysos et al. |
| 6,738,881 | B1 | 5/2004 | Ollivier et al. |
| 6,784,890 | B1 | 8/2004 | Bergeson et al. |

(Continued)

FOREIGN PATENT DOCUMENTS

CN   101419579   4/2009

OTHER PUBLICATIONS

Non-Final Office Action in related U.S. Appl. No. 12/883,888, dated Mar. 20, 2013, pp. 1-14.

(Continued)

*Primary Examiner* — Michael Sun
(74) *Attorney, Agent, or Firm* — Meyertons, Hood, Kivlin, Kowert & Goetzel, P.C.; Lawrence J. Merkel

(57) ABSTRACT

In an embodiment, a memory controller includes multiple ports. Each port may be dedicated to a different type of traffic. In an embodiment, quality of service (QoS) parameters may be defined for the traffic types, and different traffic types may have different QoS parameter definitions. The memory controller may be configured to schedule operations received on the different ports based on the QoS parameters. In an embodiment, the memory controller may support upgrade of the QoS parameters when subsequent operations are received that have higher QoS parameters, via sideband request, and/or via aging of operations. In an embodiment, the memory controller is configured to reduce emphasis on QoS parameters and increase emphasis on memory bandwidth optimization as operations flow through the memory controller pipeline.

19 Claims, 13 Drawing Sheets

(56) References Cited

U.S. PATENT DOCUMENTS

| | | |
|---|---|---|
| 6,804,757 B2 | 10/2004 | Weber |
| 6,859,438 B2 | 2/2005 | Haddock et al. |
| 7,017,020 B2 | 3/2006 | Herbst et al. |
| 7,274,700 B2 | 9/2007 | Jin et al. |
| 7,346,063 B1 | 3/2008 | Herbst |
| 7,353,310 B2 | 4/2008 | Roever |
| 7,535,898 B2 | 5/2009 | Akella et al. |
| 7,539,143 B2 | 5/2009 | Moores et al. |
| 7,647,444 B2 | 1/2010 | Dignum et al. |
| 7,653,069 B2 | 1/2010 | Lakshmanamurthy et al. |
| 7,675,925 B2 | 3/2010 | Jones |
| 7,716,395 B2 | 5/2010 | Sethi |
| 7,782,872 B2 * | 8/2010 | Rinne ................ 370/395.43 |
| 8,631,213 B2 | 1/2014 | Biswas et al. |
| 8,762,653 B2 | 6/2014 | Biswas et al. |
| 2002/0095498 A1 | 7/2002 | Chanda et al. |
| 2002/0122424 A1 * | 9/2002 | Kawarai et al. ............. 370/394 |
| 2003/0202517 A1 | 10/2003 | Kobayakawa et al. |
| 2004/0081093 A1 | 4/2004 | Haddock et al. |
| 2004/0141516 A1 | 7/2004 | Lee |
| 2005/0060456 A1 | 3/2005 | Shrader et al. |
| 2005/0073956 A1 * | 4/2005 | Moores et al. ............... 370/235 |
| 2005/0246441 A1 | 11/2005 | Chandrasekaran et al. |
| 2007/0011396 A1 | 1/2007 | Singh et al. |
| 2008/0181234 A1 | 7/2008 | Arndt et al. |
| 2008/0215786 A1 | 9/2008 | Goossens et al. |
| 2008/0244135 A1 * | 10/2008 | Akesson et al. ............ 710/241 |
| 2008/0320254 A1 | 12/2008 | Wingard et al. |
| 2009/0043920 A1 | 2/2009 | Kuris et al. |
| 2009/0070771 A1 | 3/2009 | Yuyitung et al. |
| 2009/0147731 A1 | 6/2009 | Chion et al. |
| 2009/0172318 A1 | 7/2009 | Sugai et al. |
| 2009/0228535 A1 | 9/2009 | Rathi et al. |
| 2009/0287865 A1 | 11/2009 | Aldworth et al. |
| 2010/0049913 A1 | 2/2010 | Marcu et al. |
| 2011/0197038 A1 | 8/2011 | Henriksson et al. |
| 2011/0302287 A1 * | 12/2011 | Muppirala et al. ............ 709/223 |
| 2012/0072679 A1 * | 3/2012 | Biswas et al. ................ 711/154 |
| 2013/0054901 A1 * | 2/2013 | Biswas et al. ................ 711/154 |
| 2013/0159633 A1 * | 6/2013 | Lilly ........................... 711/146 |

OTHER PUBLICATIONS

Non-Final Office Action in related U.S. Appl. No. 12/883,878, dated Mar. 27, 2013, pp. 1-13.

Office Action from U.S. Appl. No. 12/883,848, dated Mar. 12, 2012, Apple Inc., pp. 1-18.

Action from Netherlands Application No. NL2007411, dated Feb. 29, 2012, Apple Inc., pp. 1-7.

U.S. Appl. No. 12/883,848, filed Sep. 16, 2010.

U.S. Appl. No. 12/883,878, filed Sep. 16, 2010.

U.S. Appl. No. 12/883,888, filed Sep. 16, 2010.

English Abstract for Publication No. CN1 01419579, published on Apr. 29, 2009.

European Search Report for European App. No. 11180199 dated Dec. 29, 2011, pp. 1-8.

International Search Report and Written Opinion in PCT/US11/49940; mailed Dec. 22, 2011; pp. 1-11.

Office Action from Japanese Patent Application No. 2011-221349, mailed Jun. 26, 2013, (English Translation and Japanese Versions), pp. 1-7.

* cited by examiner

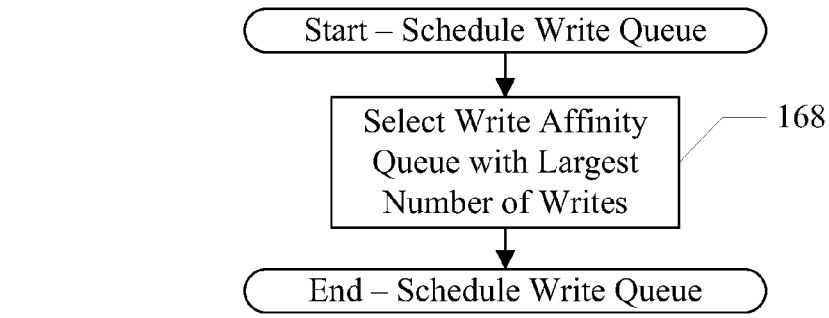

Fig. 10

| State | Meaning | Schedule |
|---|---|---|
| Green | # of Reads is below Yellow, no RTR/RTY | LLT, else affinity group containing oldest read |
| LLT Yellow | # of Reads is above Green, no RTR/RTY | LLT, else largest affinity group |
| Yellow | RTY, but no RTR | Affinity group with oldest RTY, else largest affinity group |
| Red Affinity | RTR with affinity | Affinity group with oldest RTR, else largest affinity group |
| Red Only | RTR, no affinity | Oldest RTR, else largest affinity group |

Increasing Priority ↓

Fig. 11

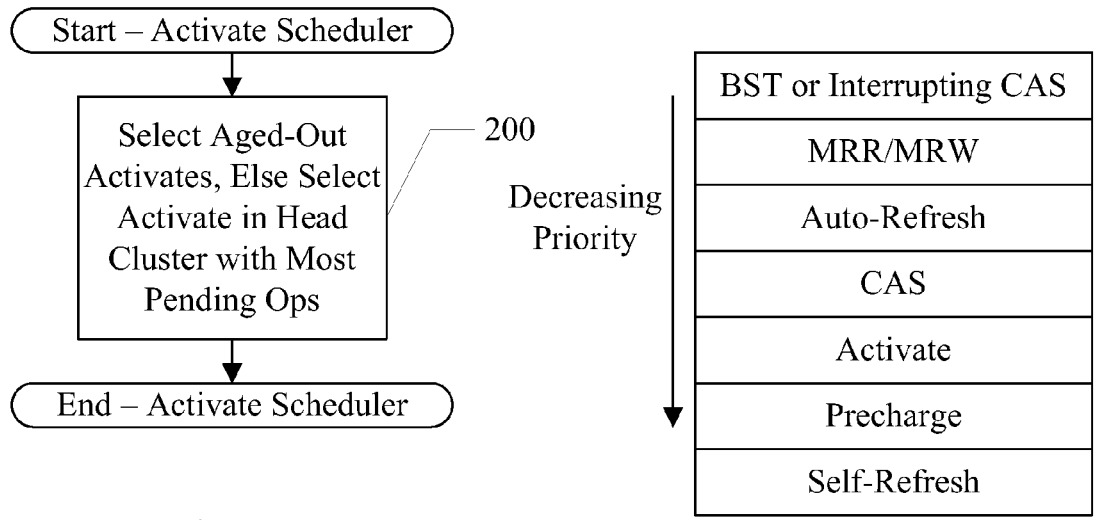
Fig. 14
Fig. 16
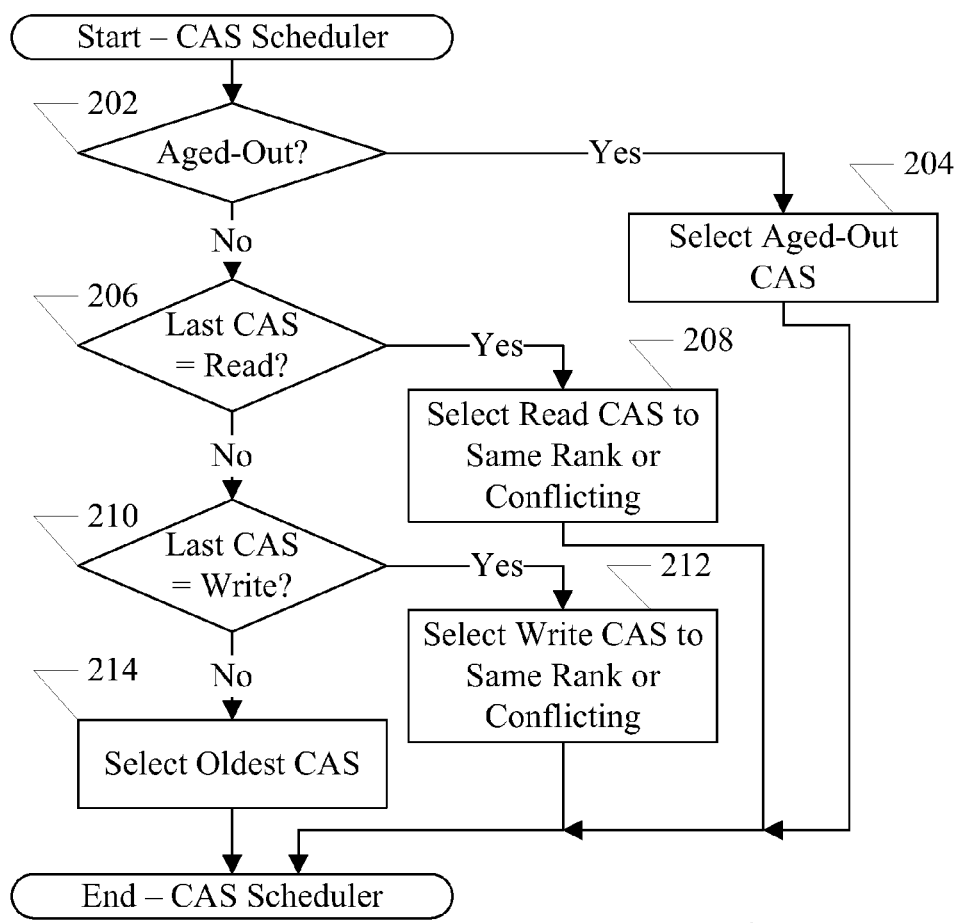
Fig. 15

QOS-AWARE SCHEDULING

This application is a continuation of U.S. patent application Ser. No. 13/653,109, filed Oct. 16, 2012, which is a continuation of U.S. patent application Ser. No. 12/883,864, filed Sep. 16, 2010 and now U.S. Pat. No. 8,314,807. The above applications are incorporated herein by reference in their entireties.

BACKGROUND

1. Field of the Invention

This invention is related to the field of memory controllers.

2. Description of the Related Art

Digital systems generally include a memory system formed from semiconductor memory devices such as static random access memory (SRAM), dynamic random access memory (DRAM), synchronous DRAM (SDRAM), double data rate (DDR, DDR2, DDR3, etc.) SDRAM including low power versions (LPDDR, LPDDR2, etc.) SDRAM, etc. The memory system is volatile, retaining data when powered on but not when powered off, but also provides low latency access as compared to nonvolatile memories such as Flash memory, magnetic storage devices such as disk drives, or optical storage devices such a compact disk (CD), digital video disk (DVD), and BluRay drives.

The memory devices forming the memory system have a low level interface to read and write the memory according to memory device-specific protocols. The sources that generate memory operations typically communicate via a higher level interface such as a bus, a point-to-point packet interface, etc. The sources can be processors, peripheral devices such as input/output (I/O) devices, audio and video devices, etc. Generally, the memory operations include read memory operations to transfer data from the memory to the device and write memory operations to transfer data from the source to the memory. Read memory operations may be more succinctly referred to herein as read operations or reads, and similarly write memory operations may be more succinctly referred to herein as write operations or writes.

Accordingly, a memory controller is typically included to receive the memory operations from the higher level interface and to control the memory devices to perform the received operations. The memory controller generally also includes queues to capture the memory operations, and can include circuitry to improve performance. For example, some memory controllers schedule read memory operations ahead of earlier write memory operations that affect different addresses.

Memory controllers have limited visibility to the different types of traffic that can be issued by the sources. Accordingly, memory controllers have not been able to segregate traffic at finer levels of granularity. Thus, performance improvements in memory controllers have been limited to the coarser mechanisms such as scheduling read operations prior to write operations.

SUMMARY

In one embodiment, a memory controller is coupled to receive memory operations from multiple sources. Each source may assign a quality of service (QoS) parameter to each memory operation transmitted by that source. The memory controller may schedule the memory operations to access memory, and the QoS parameters assigned to the memory operations may be included in the scheduling determination. Other factors that may affect the scheduling determination may include bandwidth sharing parameters between the sources. Supporting QoS parameters in the memory controller may permit the memory controller to discern relative requirements between different memory requests, which may improve performance in some embodiments.

In some embodiments, different sources may implement different sets of QoS levels. For example, a real time (RT) source may implement a set of RT QoS levels. The RT QoS levels may indicate a level of urgency to the memory operations. For example, the level of urgency may increase as the amount of time decreases between the memory operation and a point in time at which the data is needed to prevent erroneous behavior at the source. On the other hand, non-real time sources (NRT) may request low latency QoS for some operations and best effort QoS for other operations. The memory controller may rank the QoS parameters (even with their different definitions) to make scheduling decisions between requests having QoS parameters defined by the different sets of QoS levels.

BRIEF DESCRIPTION OF THE DRAWINGS

The following detailed description makes reference to the accompanying drawings, which are now briefly described.

FIG. 10 is a flowchart illustrating operation of one embodiment of the scheduler shown in FIG. 7 to select a write operation to be scheduled.

FIG. 11 is a table illustrating operation of one embodiment of the scheduler shown in FIG. 7 to select a read to be scheduled.

FIG. 14 is a flowchart illustrating operation of one embodiment of an activate scheduler shown in FIG. 12.

FIG. 15 is a flowchart illustrating operation of one embodiment of a column address strobe (CAS) scheduler shown in FIG. 12.

FIG. 16 is a table illustrating operation of one embodiment of a final scheduler shown in FIG. 12.

Figure 1:
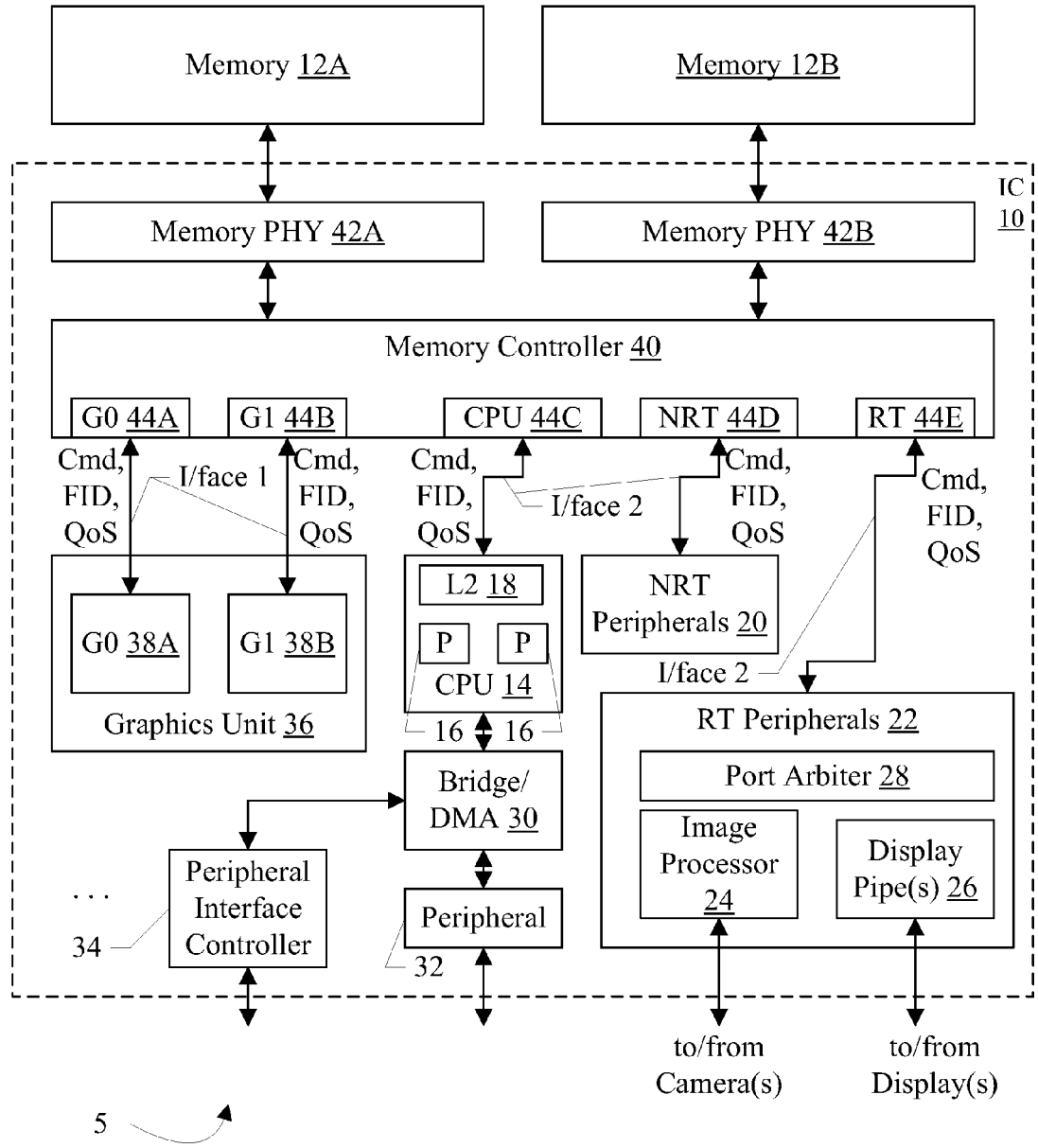
FIG. 1 is a block diagram of one embodiment of a system including a memory controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the RT peripherals include an image processor 24, one or more display pipes 26, and a port arbiter 28. Other embodiments may include more or fewer image processors 24, more or fewer display pipes 26, and/or any additional real time peripherals as desired. The image processor 24 may be coupled to receive image data from one or more cameras in the system 5. Similarly, the display pipes 26 may be coupled to one or more display controllers (not shown) which control one or more displays in the system. In the illustrated embodiment, the CPU block 14 is coupled to a bridge/direct memory access (DMA) controller 30, which may be coupled to one or more peripheral devices 32 and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 comprising one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively via a first type of interface (I/face 1), respectively. The CPU block 14 is coupled to the port 44C via a second type of interface (I/face 2). The NRT peripherals 20 and the RT peripherals 22 are coupled to the ports 44D-44E, respectively, via the second type of interface. The number of ports included in a memory controller 40 may be varied in other embodiments, as may the number of memory controllers. The number of memory PHYs 42A-42B and corresponding memories 12A-12B may be one or more than two in other embodiments.

In one embodiment, each port 44A-44E may be associated with a particular type of traffic. For example, in one embodiment, the traffic types may include RT traffic, NRT traffic, and graphics traffic. Other embodiments may include other traffic types in addition to, instead of, or in addition to a subset of the above traffic types. Each type of traffic may be characterized differently (e.g. in terms of requirements and behavior), and the memory controller may handle the traffic types differently to provide higher performance based on the characteristics. For example, RT traffic requires servicing of each memory operation within a specific amount of time. If the latency of the operation exceeds the specific amount of time, erroneous operation may occur in the RT peripheral. For example, image data may be lost in the image processor 24 or the displayed image on the displays to which the display pipes 26 are coupled may visually distort. RT traffic may be characterized as isochronous, for example. On the other hand, graphics traffic may be relatively high bandwidth, but is not latency-sensitive. NRT traffic, such as from the processors 16, is more latency-sensitive for performance reasons but survives higher latency. That is, NRT traffic may generally be serviced at any latency without causing erroneous operation in the devices generating the NRT traffic. Similarly, the less latency-sensitive but higher bandwidth graphics traffic may be generally serviced at any latency. Other NRT traffic may include audio traffic, which is relatively low bandwidth and generally may be serviced with reasonable latency. Most peripheral traffic may also be NRT (e.g. traffic to storage devices such as magnetic, optical, or solid state storage).

By providing ports 44A-44E associated with different traffic types, the memory controller 40 may be exposed to the different traffic types in parallel, and may thus be capable of making better decisions about which memory operations to service prior to others based on traffic type. In some embodiments, each port may be dedicated exclusively to either RT or NRT traffic. In other embodiments, the ports may be associated with the particular traffic type, but other traffic types may be supported on the port. In an embodiment, graphics traffic may be considered to be NRT traffic, but having visibility to the graphics traffic separate from other NRT traffic may be useful for bandwidth balancing among the other NRT sources and the RT source. Similarly, having the processor traffic separate from the other NRT sources may be useful in bandwidth balancing. In the illustrated embodiment, the RT port 44E may be associated with RT traffic and the remaining ports 44A-44D may be associated with NRT traffic.

Generally, a port may be a communication point on the memory controller 40 to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals such as the display pipes 26 and the image processor 24 may share the RT port 44E. A port may be coupled to a single interface to communicate with the one or more sources. Thus, when sources share an interface, there may be an arbiter on the sources' side of the interface to select between the sources. For example, the L2 cache 18 may serve as an arbiter for the CPU port 44C to the memory controller 40. The port arbiter 28 may serve as an arbiter for the RT port 44E, and a similar port arbiter (not shown) may be an arbiter for the NRT port 44D. The single source on a port or the combination of sources on a port may be referred to as an agent.

Each port 44A-44E is coupled to an interface to communicate with its respective agent. The interface may be any type of communication medium (e.g. a bus, a point-to-point interconnect, etc.) and may implement any protocol. In some embodiments, the ports 44A-44E may all implement the same interface and protocol. In other embodiments, different ports may implement different interfaces and/or protocols. For example, the embodiment illustrated in FIG. 1 includes the graphics controllers 38A-38B using one type of interface/protocol and the CPU block 14, the NRT peripherals 20 and the RT peripherals 22 using another type of interface/protocol. An interface may refer to the signal definitions and electrical properties of the interface, and the protocol may be the logical definition of communications on the interface (e.g. including commands, ordering rules, coherence support if any, etc.). Supporting more than one interface on the various ports 44A-44E may eliminate the need to convert from one interface supported by a source/agent and the interface supported by the memory controller 40, which may improve performance in some embodiments. Additional, some embodiments of the integrated circuit 10 may include circuitry purchased from a third party as a prepackaged unit typically referred to in the industry as intellectual property (IP). The IP may be "hard" (in which case it is specified as a netlist of circuits that are laid out and placed on the IC as a block) or "soft" (in which case it is specified as a synthesizable block that can be synthesized with other blocks to be included in the integrated circuit 10). Both soft and hard IP include a specified interface and protocol, which generally cannot be changed by the designer of the integrated circuit 10 (at least without payment of fees to the third party that owns the IP). Accordingly, supporting multiple interfaces/protocols may permit easier inclusion of third party IP.

In an embodiment, each source may assign a quality of service (QoS) parameter to each memory operation transmitted by that source. The QoS parameter may identify a requested level of service for the memory operation. Memory operations with QoS parameter values requesting higher levels of service may be given preference over memory operations requesting lower levels of service. For example, each of the interfaces to the ports 44A-44E in FIG. 1 are shown to include a command (Cmd), a flow identifier (FID), and a QoS parameter (QoS). The command may identify the memory operation (e.g. read or write). A read command/memory operation causes a transfer of data from the memory 12A-12B to the source, whereas a write command/memory operation causes a transfer of data from the source to the memory 12A-12B. Commands may also include commands to program the memory controller 40. For example, which address ranges are mapped to which memory channels, bandwidth sharing parameters, etc. may all be programmable in the memory controller 40. The FID may identify a memory operation as being part of a flow of memory operations. A flow of memory operations may generally be related, whereas memory operations from different flows, even if from the same source, may not be related. A portion of the FID (e.g. a source field) may identify the source, and the remainder of the FID may identify the flow (e.g. a flow field). Thus, an FID may be similar to a transaction ID, and some sources may simply transmit a transaction ID as an FID. In such a case, the source field of the transaction ID may be the source field of the FID and the sequence number (that identifies the transaction among transactions from the same source) of the transaction ID may be the flow field of the FID. Sources that group transactions as a flow, however, may use the FIDs differently. Alternatively, flows may be correlated to the source field (e.g. operations from the same source may be part of the same flow and operations from a different source are part of a different flow). The ability to identify transactions of a flow may be used in a variety of ways described below (e.g. QoS upgrading, reordering, etc.).

Thus, a given source may be configured to use QoS parameters to identify which memory operations are more important to the source (and thus should be serviced prior to other memory operations from the same source), especially for sources that support out-of-order data transmissions with respect to the address transmissions from the source. Furthermore, the QoS parameters may permit sources to request higher levels of service than other sources on the same port and/or sources on other ports.

In some embodiments, different traffic types may have different definitions of QoS parameters. That is, the different traffic types may have different sets of QoS parameters. The meaning of a given QoS parameter value depends on the set of QoS parameters from which it is drawn. For example, a set of RT QoS parameters may be defined and a set of NRT QoS parameters may be defined. Thus, an RT QoS parameter value is assigned meaning within the RT QoS parameter set and an NRT QoS parameter value is assigned meaning within the NRT QoS parameter set. Other embodiments may implement the same QoS parameter set on all ports or among all traffic types.

The memory controller 40 may be configured to process the QoS parameters received on each port 44A-44E and may use the relative QoS parameter values to schedule memory operations received on the ports with respect to other memory operations from that port and with respect to other memory operations received on other ports. More specifically, the memory controller 40 may be configured to compare QoS parameters that are drawn from different sets of QoS parameters (e.g. RT QoS parameters and NRT QoS parameters) and may be configured to make scheduling decisions based on the QoS parameters.

The QoS parameters may thus be values that are transmitted with memory operations, and which may be used in the memory controller to identify requested QoS levels. The QoS levels may be relative to other levels, and may specify which memory operations are preferred to be selected prior to others having lower QoS levels. Thus, the QoS levels may function as a sort of priority after interpretation by the memory controller 40 to consider QoS levels defined in different sets, although the priority can be balanced by other factors.

In some embodiments, the memory controller 40 may be configured to upgrade QoS levels for pending memory operations. Various upgrade mechanism may be supported. For example, the memory controller 40 may be configured to upgrade the QoS level for pending memory operations of a flow responsive to receiving another memory operation from the same flow that has a QoS parameter specifying a higher QoS level. This form of QoS upgrade may be referred to as in-band upgrade, since the QoS parameters transmitted using the normal memory operation transmission method also serve as an implicit upgrade request for memory operations in the same flow. The memory controller 40 may be configured to push pending memory operations from the same port or source, but not the same flow, as a newly received memory operation specifying a higher QoS level. As another example, the memory controller 40 may be configured to couple to a sideband interface from one or more agents, and may upgrade QoS levels responsive to receiving an upgrade request on the sideband interface. In another example, the memory controller 40 may be configured to track the relative age of the pending memory operations. The memory controller 40 may be configured to upgrade the QoS level of aged memory operations at certain ages. The ages at which upgrade occurs may depend on the current QoS parameter of the aged memory operation.

The memory controller 40 may be configured to determine the memory channel addressed by each memory operation received on the ports, and may be configured to transmit the memory operations to the memory 12A-12B on the corresponding channel. The number of channels and the mapping of addresses to channels may vary in various embodiments and may be programmable in the memory controller. The memory controller may use the QoS parameters of the memory operations mapped to the same channel to determine an order of memory operations transmitted into the channel. That is, the memory controller may reorder the memory operations from their original order of receipt on the ports. Additionally, during processing in the channel, the memory operations may be reordered again at one or more points. At each level of reordering, the amount of emphasis placed on the QoS parameters may decrease and factors that affect memory bandwidth efficiency may increase. Once the memory operations reach the end of the memory channel pipeline, the operations may have been ordered by a combination of QoS levels and memory bandwidth efficiency. High performance may be realized in some embodiments.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler/rotator circuitry, image compression/decompression circuitry, etc.

As mentioned above, the RT peripherals 22 may include the image processor 24 and the display pipes 26. The display pipes 26 may include circuitry to fetch one or more frames and to blend the frames to create a display image. The display pipes 26 may further include one or more video pipelines. The result of the display pipes 26 may be a stream of pixels to be displayed on the display screen. The pixel values may be transmitted to a display controller for display on the display screen. The image processor 24 may receive camera data and process the data to an image to be stored in memory.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a wireless fidelity (WiFi) controller. An audio unit including various audio processing devices may be included in the peripherals 32. One or more digital signal processors may be included in the peripherals 32. The peripherals 32 may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMM5), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

It is noted that other embodiments of the memory controller 40 may not implement multiple ports, but may still implement QoS parameters, different QoS parameters/levels for different traffic types or classes such as NRT and RT, and QoS upgrading.

Figure 2:
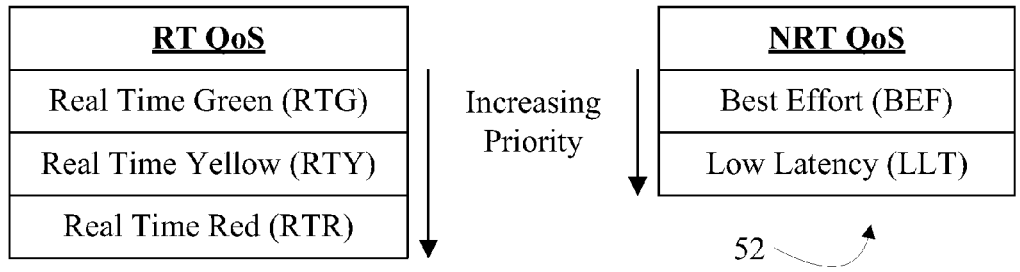
FIG. 2 is a block diagram of one embodiment of QoS levels that may be defined for RT and NRT classes of traffic.

Turning next to FIG. 2, a pair of tables 50 and 52 are shown illustrating a definition of a set of RT QoS levels and a set of NRT QoS levels, respectively, for one embodiment. Other embodiments may include additional or substitute levels, and other embodiments may include additional levels in combination with a subset of the illustrated levels. As illustrated by the arrows pointing downward next to the tables 50 and 52 in FIG. 2, the tables illustrate the QoS levels within a set in increasing priority. That is, the real time green (RTG) QoS level is the lowest priority RT QoS level; the real time yellow (RTY) QoS level is the medium priority RT QoS level; and the real time red (RTR) QoS level is the highest priority RT QoS level. Similarly, the best effort (BEF) QoS level is the lowest priority NRT QoS level and the low latency (LLT) QoS level is the highest priority NRT QoS level. The illustration of the RT QoS levels and the NRT QoS levels next to each other in FIG. 2 is not intended to indicate the relative priority of the RT QoS levels with regard to the NRT QoS levels. Instead, the memory controller 40 may determine such relative priorities based, in part, on other factors indicating the traffic that is being experienced by the memory controller 40 across the various types and ports.

The RTG, RTY, and RTR QoS levels may reflect relative levels of urgency from an RT source. That is, as the amount of time before data is needed by the RT source to prevent erroneous operation decreases, the QoS level assigned to each memory operation increases to indicate the higher urgency. By treating operations having higher urgency with higher priority, the memory controller 40 may return data to the RT source more quickly and may thus aid the correct operation of the RT source.

For example, the display pipe 26 may initiate the reading of frame data from the memory 12A-12B for the next frame to be displayed in the vertical blanking interval for the display. The frame is not actually displayed until the end of the vertical blanking interval, and thus the display pipe 26 may use the RTG level during this time period. As the frame begins to be displayed (i.e. the display controller begins reading frame pixels from the display pipe 26 output), the display pipe 26 may raise the QoS level of frame data read operations to the memory to the RTY level. For example, if the amount of frame data that is read ahead of the current pixel being displayed reduces below a first threshold, the level may be raised to RTY. At a second threshold (lower than the first threshold), the display pipe 26 may raise the QoS level of memory operations to RTR.

The BEF NRT QoS level may be a request to return the data as quickly as the memory controller 40 is able, once the needs of other flows of data are met. On the other hand, the LLT NRT QoS level may be a request for low latency data. NRT memory operations having the LLT QoS level may be treated more closely, in terms of priority with other memory transactions, than those having the BEF QoS level (at least in some cases). In other cases, the BEF and LLT QoS levels may be treated the same by the memory controller 40.

Figure 3:
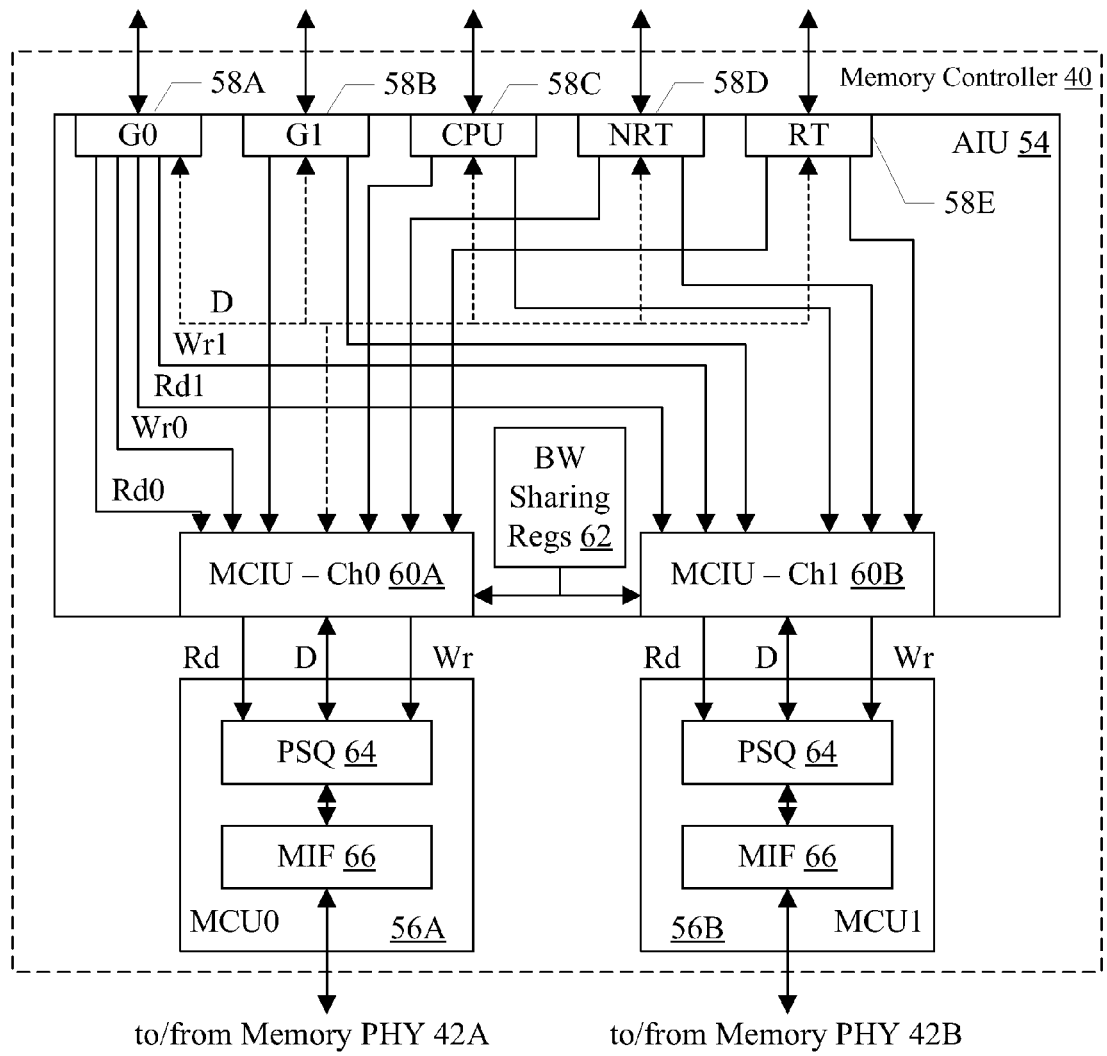
FIG. 3 is a block diagram of one embodiment of the memory controller shown in FIG. 1.

Turning next to FIG. 3, a block diagram of one embodiment of the memory controller 40 is shown. In the embodiment of FIG. 3, the memory controller 40 includes an agent interface unit (AIU) 54 and one or more memory channel units 56A-56B. There may be one memory channel unit 56A-56B for each memory channel included in a given embodiment, and other embodiments may include one channel or more than two channels. As illustrated in FIG. 3, the AIU 54 may include multiple port interface units 58A-58E. More particularly, there may be a port interface unit 58A-58E for each port 44A-44E on the memory controller 40. The AIU 54 may further include memory channel interface units (MCIUs) 60A-60B (one for each memory channel unit 56A-56B). The AIU 54 may further include one or more bandwidth sharing registers 62, which may be programmable to indicate how bandwidth is to be shared among the ports. The port interface units 58A-58E may be coupled to receive memory operations and to receive/transmit data and responses on the corresponding port, and may also be coupled to the MCIUs 60A-60B. The MCIUs 60A-60B may further be coupled to the bandwidth sharing registers 62 and to the corresponding MCU 56A-56B. As illustrated in FIG. 3, the MCUs 56A-56B may each include a presorting queue (PSQ) 64 and a memory interface circuit (MIF) 66. The PSQs 64 are coupled to the corresponding MCIUs 60A-60B and to the MIF 66 in the same MCU 56A-56B. The MIF 66 in each MCU 56A-56B is coupled to the corresponding memory PHY 42A-42B.

The AIU 54 may be configured to receive memory operations on the ports 44A-44E and to switch the memory operations to the channels addressed by those memory operations, using the QoS parameters of the memory operations as a factor in deciding which memory operations to transmit to one of the MCUs 56A-56B prior to other memory operations to the same MCU 56A-56B. Other factors may include the bandwidth sharing controls to divide bandwidth on the memory channels among the ports.

More particularly, each port interface unit 58A-58E may be configured to receive the memory operations from the corresponding port 44A-44E, and may be configured to determine the memory channel to which a given memory operation is directed. The port interface unit 58A-58E may transmit the memory operation to the corresponding MCIU 60A-60B, and may transmit reads separately from writes in the illustrated embodiment. Thus, for example, the port interface unit 58A may have a Rd0 connection and a Wr0 connection to the MCIU 60A for read operations and write operations, respectively. Similarly, the port interface unit 58A may have a Rd1 and a Wr1 connection to the MCIU 60B. The other port interface units 58B-58E may have similar connections to the MCIU 60A-60B. There may also be a data interface to transmit read data from the port interface units 58A-58B to the MCIUs 60A-60B, illustrated generally as the dotted "D" interface for the MCIU 60A in FIG. 3.

The MCIUs 60A-60B may be configured to queue the memory operations provided by the port interface units 58A-58E, and to arbitrate among the memory operations to select operations to transmit to the corresponding MCUs 56A-56B. The arbitration among operations targeted at a given memory channel may be independent of the arbitration among operations targeted at other memory channels.

The MCIUs 60A-60B may be coupled to the bandwidth sharing registers 62, which may be programmed to indicate how memory bandwidth on a channel is to be allocated to memory operations in the given channel. For example, in one embodiment, the MCIUs 60A-60B may use a deficit-weighted round-robin algorithm to select among the ports when there is no high priority traffic present (e.g. RTR or RTY QoS levels in the RT traffic). When RTR or RTY traffic is present, a round-robin mechanism may be used to select among the ports that have RTR/RTY traffic. The weights in the deficit weighted round-robin mechanism may be programmable to allocated relatively more bandwidth to one port than another. The weights may be selected to favor processor traffic over the graphics and NRT ports, for example, or to favor the graphics ports over other ports. Any set of weights may be used in various embodiments. Other embodiments may measure the bandwidth allocations in other ways. For example, percentages of the total bandwidth may be used. In other embodiments, a credit system may be used to control the relative number of operations from each port that are selected. Generally, however, operations may be selected based on both QoS parameters and on bandwidth sharing requirements in various embodiments.

The MCUs 56A-56B are configured to schedule memory operations from their queues to be transmitted on the memory channel. The MCUs may be configured to queue reads and writes separately in the PSQs 64, and may be configured to arbitrate between reads and writes using a credit based system, for example. In the credit-based system, reads and writes are allocated a certain number of credits. The number of write credits and read credits need not be equal. Each scheduled memory operation may consume a credit. Once both the write credits and the read credits are reduced to zero or less and there is a pending transaction to be scheduled, both credit may be increased by the corresponding allocated number of credits. Other embodiments may use other mechanisms to select between reads and writes. In one embodiment, the credit system may be part of the arbitration mechanism between reads and writes (along with measurements of the fullness of the write queue). That is, as the write queue becomes more full, the priority of the writes in the arbitration mechanism may increase. Additional details are set forth below.

In one embodiment, the QoS parameters of the write operations may be eliminated on entry into the PSQs 64. The read operations may retain the QoS parameters, and the QoS parameters may affect the read scheduling from the PSQs 64.

In an embodiment, the MCUs 56A-56B may schedule memory operations in bursts of operations (each operation in the burst consuming a credit). If the burst reduces the credit count to zero, the burst may be permitted to complete and may reduce the credit count to a negative number. When the credit counts are increased later, the negative credits may be accounted for, and thus the total number of credits after increase may be less than the allocated credit amount.

To create bursts of memory operations for scheduling, the MCUs 56A-56B may group memory operations into affinity groups. A memory operation may be said to exhibit affinity with another memory operation (or may be said to be affine to the other memory operation) if the operations may be performed efficiently on the memory interface when performed in close proximity in time. Efficiency may be measured in terms of increased bandwidth utilization. For example, SDRAM memories are characterized by a page that can be opened using an activate command (along with an address of the page). The size of the page may vary from embodiment to embodiment, and generally may refer to a number of contiguous bits that may be available for access once the activate command has been transmitted. Asynchronous DRAM memories may similarly have a page that may be opened by asserting a row address strobe control signal and by providing the row address. Two or more memory operations that access data in the same page may be affine, because only one activate/RAS may be needed on the interface for the memory operations. SDRAM memories also have independent banks and ranks. A bank may be a collection of memory cells within an SDRAM chip that may have an open row (within which page hits may be detected). A rank may be selected via a chip select from the memory controller, and may include one or more SDRAM chips. Memory operations to different ranks or banks may also be affine operations, because they do not conflict and thus do not require the page to be closed and a new page to be opened. Memory operations may be viewed as affine operations only if they transfer data in the same direction (i.e. read operations may only be affine to other read operations, and similarly write operations may only be affine other write operations). Memory operations to the same page (or to an open page) may be referred to as page hits, and memory operations to different banks/ranks may be referred to as bank hits and rank hits, respectively.

The MCUs 56A-56B may also be configured to schedule commands on the memory interface to the memories 12A-12B (through the memory PHYs 42A-42B) to perform the scheduled memory operations. More particularly, in an embodiment, the MCUs 56A-56B may be configured to presynthesize the commands for each memory operation and to enqueue the commands. The MCUs 56A-56B may be configured schedule the commands to provide efficient use of the memory bandwidth. The MIFs 66 in each MCU 56A-56B may implement the presynthesis of commands and the scheduling of the commands, in an embodiment.

Figure 4:
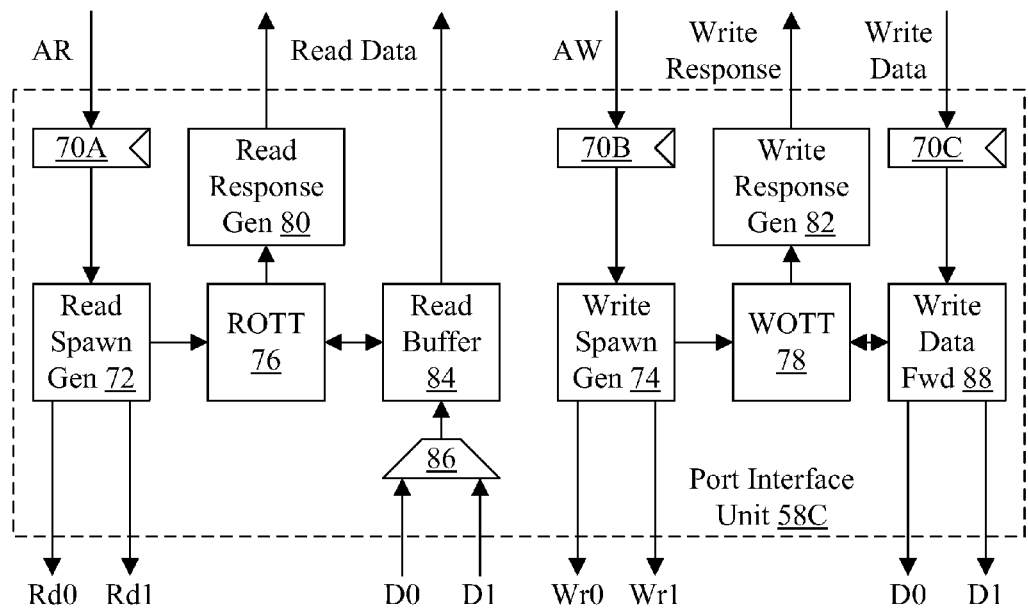
FIG. 4 is a block diagram of one embodiment of a port interface unit that may be included in one embodiment of an agent interface unit shown in FIG. 3.

Turning now to FIG. 4, a block diagram of one embodiment of the port interface unit 58C is shown. Other port interface circuits 58A-58B and 58D-58E may be similar, although there may be differences in implementation for port interface circuits that couple to different interfaces. In the illustrated embodiment, the port interface unit 58C includes buffers 70A-70B coupled to read (AR) and write (AW) interfaces to receive read and write memory operations, respectively, as illustrated in FIG. 4. The buffers 70A-70B are coupled to a read spawn generator 72 and a write spawn generator 74, respectively, which are coupled to the Rd0/Rd1 interfaces and the Wr0/Wr1 interfaces, respectively. The read spawn generator 72 is coupled to a read outstanding transaction table (ROTT) 76, and the write spawn generator 74 is coupled to a write outstanding transaction table (WOTT) 78. The ROTT 76 is coupled to a read response generator 80 which is configured to generate a read response on the interface. The ROTT is also coupled to a read buffer 84, which is coupled to receive data from either MCU 56A-56B through a mux 86 and to provide read data on the interface. The WOTT 78 is coupled to a write response generator 82 which is configured to generate a write response on the interface. The WOTT 78 is also coupled to a write data forward buffer 88, which is coupled to provide data to the MCUs 56A-56B and is coupled to receive data from a buffer 70C, which is coupled to receive write data from the interface.

For a read operation, the buffer 70A may be configured to receive the operation from the interface. The buffer 70A may be provided to capture the read operation and hold it for processing by the read spawn generator 72. In an embodiment, the buffer 70A may be a two entry "skid" buffer that permits a second operation to be captured in the event of delay for an unavailable resource to become available, for example, thus easing timing on propagating back pressure requests to the source(s) on the interface. The buffers 70B-70C may similarly be two entry skid buffers. Other embodiments may include additional entries in the skid buffers, as desired.

The read spawn generator 72 may be configured to decode the address of the read operation to determine which memory channel is addressed by the read operation. The read spawn generator 72 may be configured to transmit the read operation to the addressed memory channel via the Rd0 or Rd1 interface. In some embodiments, a read operation may overlap memory channels. Each read operation may specify a size (i.e. a number of bytes to be read beginning at the address of the operation). If the combination of the size and the address indicates that bytes are read from more than one channel, the read spawn generator 72 may be configured to generate multiple read operations to the addressed channels. The read data from the multiple read operations may be accumulated in the read buffer 84 to be returned to the source.

The read spawn generator 72 may also be configured to update the ROTT 76, allocating an entry in the ROTT 76 to track the progress of the read. Once the data has been received in the read buffer 84, the ROTT 76 may be configured to signal the read response generator 80 to generate a read response to transfer the data to the source. If read data is to be returned in order on the interface (e.g. according to the protocol on the interface), the data may remained buffered in the read buffer 84 until previous reads have been returned and then the ROTT 76 may signal the read response generator 80 to transfer the data. The ROTT 76 may be coupled to receive various status signals from the MCUs 56A-56B to update the status of the pending read operations (not shown in FIG. 4).

The buffer 70B, the write spawn generator 74, and the WOTT 78 may operate similarly for write operations. However, data is received rather than transmitted on the interface. The write data may be received in the write data forward buffer 88, and may be forwarded to the current location of the corresponding write operation. The WOTT 78 may signal for the write response once the write has been guaranteed to complete, terminating the writes on the interface with a write response earlier than might otherwise be possible.

It is noted that, while the embodiment illustrated in FIG. 4 includes an interface that conveys read and write memory operations separately (AR and AW, respectively), other embodiments may include a single transmission medium for both read and write operations. In such an embodiment, a single buffer 70 may receive the operations, and the read spawn generator 72 and the write spawn generator 74 may decode the command from the interface to differentiate read and write operations. Alternatively, there may be one spawn generator which generates both read and write operations and updates the ROTT 76 or the WOTT 78 accordingly.

Figure 5:
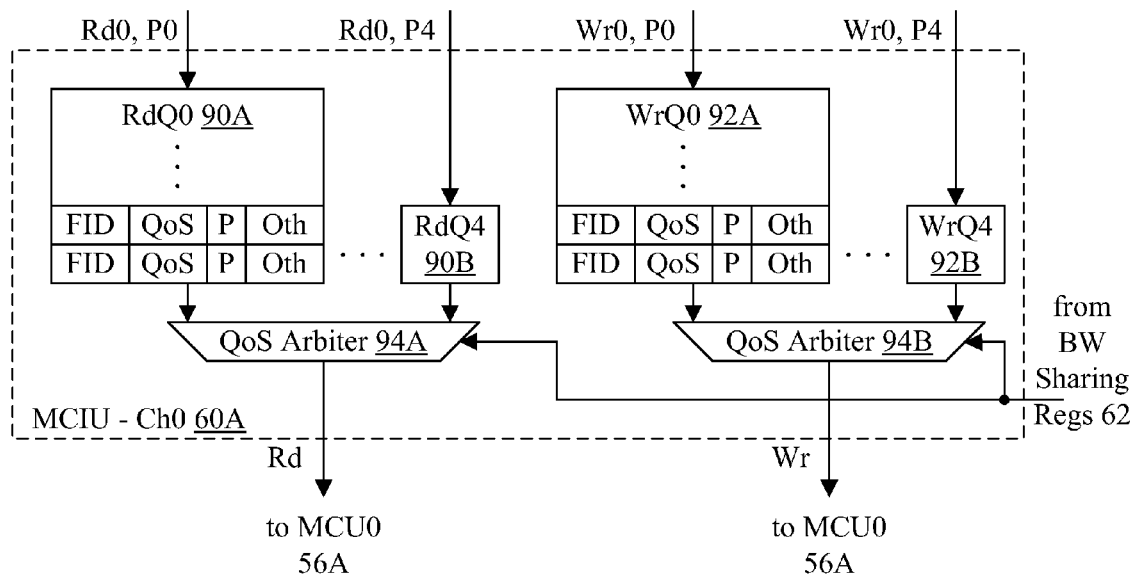
FIG. 5 is a block diagram of one embodiment of a memory channel interface unit that may be included in one embodiment of an agent interface unit shown in FIG. 3.

Turning now to FIG. 5, a block diagram illustrating one embodiment of the MCIU 60A is shown. The MCIU 60B may be similar except that it is coupled to receive the Rd1 and Wr1 inputs from each port and is coupled to the MCU 56B. In the illustrated embodiment, the MCIU includes a set of read queues such as read queues 90A-90B shown in FIG. 5 and a set of write queues such as write queues 92A-92B. There may be one read queue and one write queue for each port. Each read queue is coupled to the Rd0 output of one of the port interface units 58A-58E and is coupled to a QoS arbiter 94A. Each write queue is coupled to the Wr0 outputs of a respective one of the port interface units 58A-58E and to a QoS arbiter 94B. The outputs of the QoS arbiters 94A-94B are provided to the MCU 56A as read and write inputs, respectively. The QoS arbiters 94A-94B are coupled to receive data from the bandwidth sharing registers 62.

Two read queue entries are shown in the read queue 90A, and other read queues may be similar. The read queue 90A includes the FID of the memory operation, the QoS parameter of the operation, a push bit (P), and an other field (Oth). The FID and the QoS parameter may be the same values that were transmitted with the memory operation on the interface to the memory controller 40. Alternatively, one or both values may be recoded by the memory controller 40 for convenience internally. The push bit may be used to force a higher priority on the memory operation if a second memory operation is ordered behind the memory operation and is a higher QoS level then than the memory operation. For example, the second memory operation may be received on the same port as the memory operation, and the interface on that port may require that data be returned in the same order that the memory operations are transmitted. By forcing the higher priority, the memory operation may be performed more quickly and may thus permit a more rapid servicing of the second memory operation with the higher QoS level. The other field may include various other information for the memory operation (e.g. the address, size information, etc.). Similarly, two write queue entries are shown in the write queue 92A, and may include fields similar to the read queue 90A. The other field may store different information for writes as compared to reads, if desired.

The QoS arbiters 94A-94B may arbitrate among the read queues 90A-90B and the write queues 92A-92B, respectively. The QoS arbiters may take into account both QoS levels (as indicated by the QoS parameters in the queues) and the bandwidth sharing parameters from the bandwidth sharing registers. The selected read and write operation (if any) is transmitted to the MCU 56A.

It is noted that, in some embodiments, there may be one or more bypass paths from a port interface unit to the QoS arbiters 94A and/or 94B (not shown in FIG. 5). For example, reads from the CPU port interface unit 58C may bypass to the QoS arbiter 94A to permit lower latency reads to the processors. In some embodiments, one or more memory operations in the queues 90A-90B and/or 92A-92B may be masked from the QoS arbiters 94A-94B. For example, write operations for which the corresponding data has not yet reached the memory controller 40 may be masked from the QoS arbiters 94A-94B, to avoid blocking write operations from other ports for which corresponding data has reached the memory controller 40.

Figure 6:
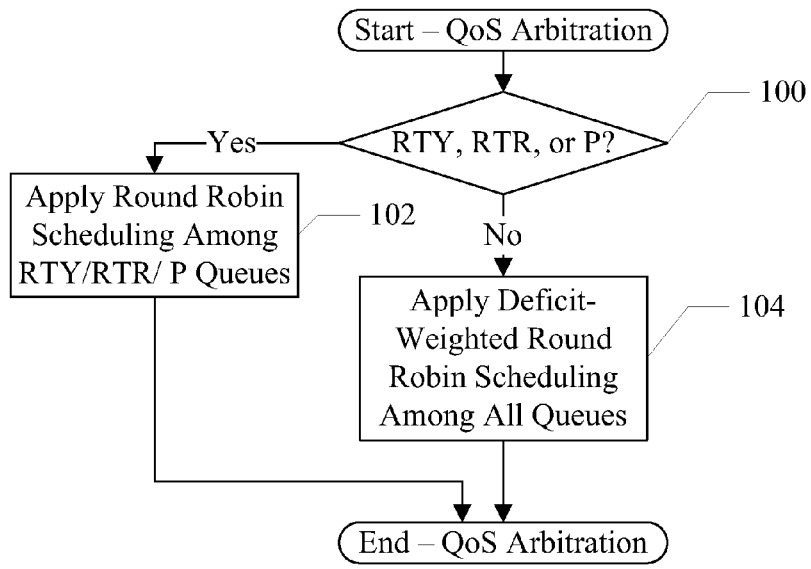
FIG. 6 is a flowchart illustrating operation of one embodiment of a QoS arbiter shown in FIG. 5.

FIG. 6 is a flowchart illustrating operation of one embodiment of each of the QoS arbiters 94A-94B. While blocks are shown in a particular order for ease of understanding, other orders may be used. Blocks may be performed in parallel in combinatorial logic in the QoS arbiters 94A-94B. Blocks, combinations of blocks, and/or the flowchart as a whole may be pipelined over multiple clock cycles. The QoS arbiters 94A-94B may be configured to implement the operation illustrated in FIG. 6.

If at least one memory operation in one of the queues to which the QoS arbiter is coupled has an RT QoS level of RTY or RTR, or the push bit is set for at least one memory operation (decision block 100, "yes" leg), the QoS arbiter may arbitrate among the queues having the RTY or RTR QoS levels and/or set push bits (block 102). Since each queue corresponds to a port in this embodiment, the QoS arbiter may effectively be arbitrating among the ports having the RTY or RTR QoS levels and/or set push bits. Thus, the AIU 54 may treat the RTG, BEF, and LLT QoS levels as equal in this embodiment. The AIU 54 may treat the RTR and RTY QoS levels and set push bit operations as equal to each other and higher priority than the other levels in this embodiment. Other embodiments may have additional levels of granularity (e.g. RTR may be treated as higher priority that RTY, RTG and LLT may be treated as higher priority than BEF, etc.). Additionally, other embodiments may implement a different scheme than round robin.

On the other hand, if there are no memory operations having the RTY or RTR QoS levels and no memory operations having set push bits (decision block 100, "no" leg), the QoS arbiter may arbitrate among all queues (all ports) (block 104). For example, the QoS arbiter may implement a deficit-weighted round robin scheme among the ports, where the weights may be based on the bandwidth sharing parameters (or the bandwidth sharing parameters may be the weights). Other embodiments may implement other arbitration schemes among all the ports.

Figure 7:
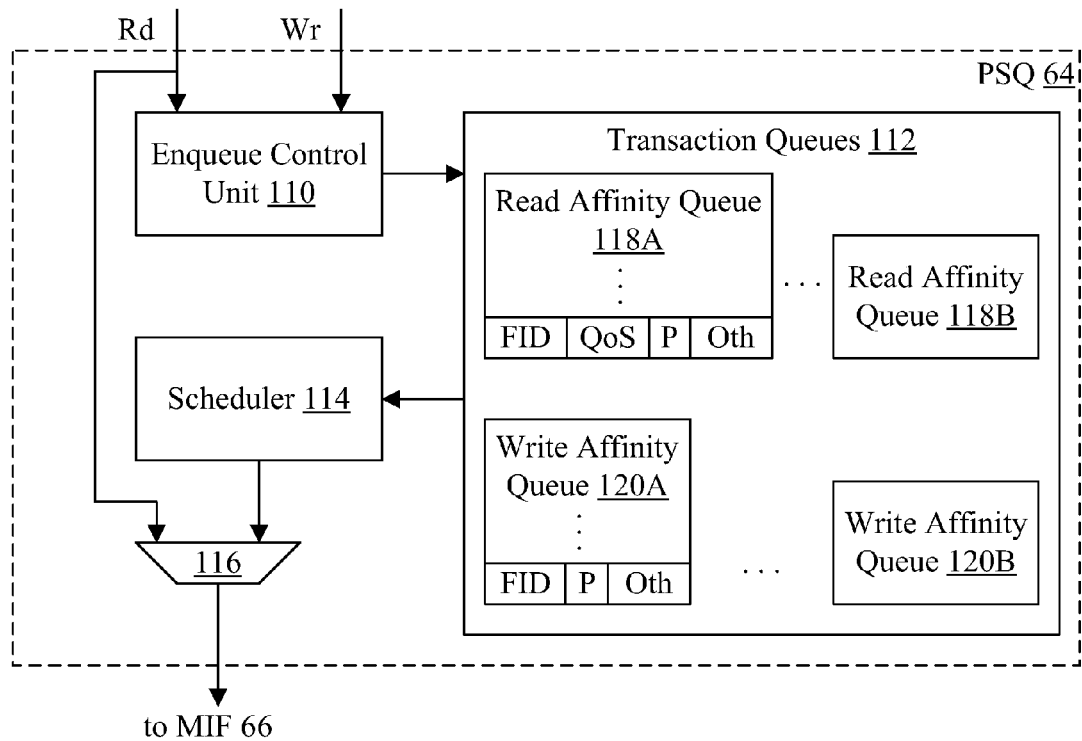
FIG. 7 is a block diagram of one embodiment of a presorting queue (PSQ) illustrated in a memory channel unit in FIG. 3.

Turning now to FIG. 7, a block diagram of one embodiment of the PSQ 64 is shown. In the illustrated embodiment, the PSQ 64 includes an enqueue control unit 110, a set of transaction queues 112, a scheduler 114, and a bypass mux 116. The enqueue control unit 110 is coupled to receive the read and write operations from the corresponding MCIU 60A or 60B, and is coupled to the transaction queues 112. The transaction queues 112 are further coupled to the scheduler 114, the output of which is coupled to the bypass mux 116. The bypass mux 116 is coupled to receive the read operation as well, and is configured to select between the memory operation scheduled by the scheduler 114 and the read operation. For example, the read operation may bypass the transaction queues 112 if there are no reads in the transaction queues 112 and the number of writes is below a threshold level. Other embodiments may not implement bypassing and the bypass mux 116 may be eliminated.

As illustrated in FIG. 7, the transaction queues 112 may include a set of read affinity queues such as queues 118A-118B and a set of write affinity queues such as queues 120A-120B. The number of read affinity queues and write affinity queues may vary from embodiment to embodiment, and the number of read affinity queues need not equal the number of write affinity queues. Each affinity queue may store one or more memory operations that have been determined by the enqueue control unit 110 to exhibit affinity with each other. Thus, as a memory operation is received by the enqueue control unit 110, the enqueue control unit 110 may be configured to compare the memory operation to the affinity queues 118A-118B (for a read operation) or the affinity queues 120A-120B (for a write operation). If the memory operation is affine, it may be enqueued in the corresponding affinity queue. If not, the memory operation may be enqueued in another affinity queue. In an embodiment, a read affinity queue may be reserved for reads that are not affine, and similarly a write affinity queue may be reserved for writes that are not affine.

The scheduler 114 may be configured to schedule memory operations to be transmitted to the MIF 66. For read operations, the scheduler 114 may be configured to consider both QoS levels in the read affinity queues 118A-118B and the number of affine memory operations in each read affinity queue 118A-118B. More details of one embodiment are described below. Generally, however, the scheduler 114 may be configured to favor read operations that have high QoS levels and larger numbers of affine memory operations. For write operations, the QoS levels may be eliminated in the PSQ 64. That is, the QoS levels of the write operations may be dropped as the write operations are written to the transaction queues 112. As illustrated in the exemplary entries in each of the queues 118A and 120A, the read operations may retain QoS while the write operations may not. The scheduler 114 may be configured to schedule between read operations and write operation based on fullness of the write queues and QoS levels in the read queues, for example. Additional details will be provided further below.

It is noted that, in some embodiments, the read affinity queues 118A-118B and write affinity queues 120A-120B may be physically instantiated (e.g. as separate data structures or as one or more data structures that are divided via logic circuitry in the PSQ 64 and/or programmably separated). In other embodiments, the affinity queues may be virtual. That is, there may be a read queue and a write queue, for example, and tagging may be used to identify affine operations.

Figure 8:
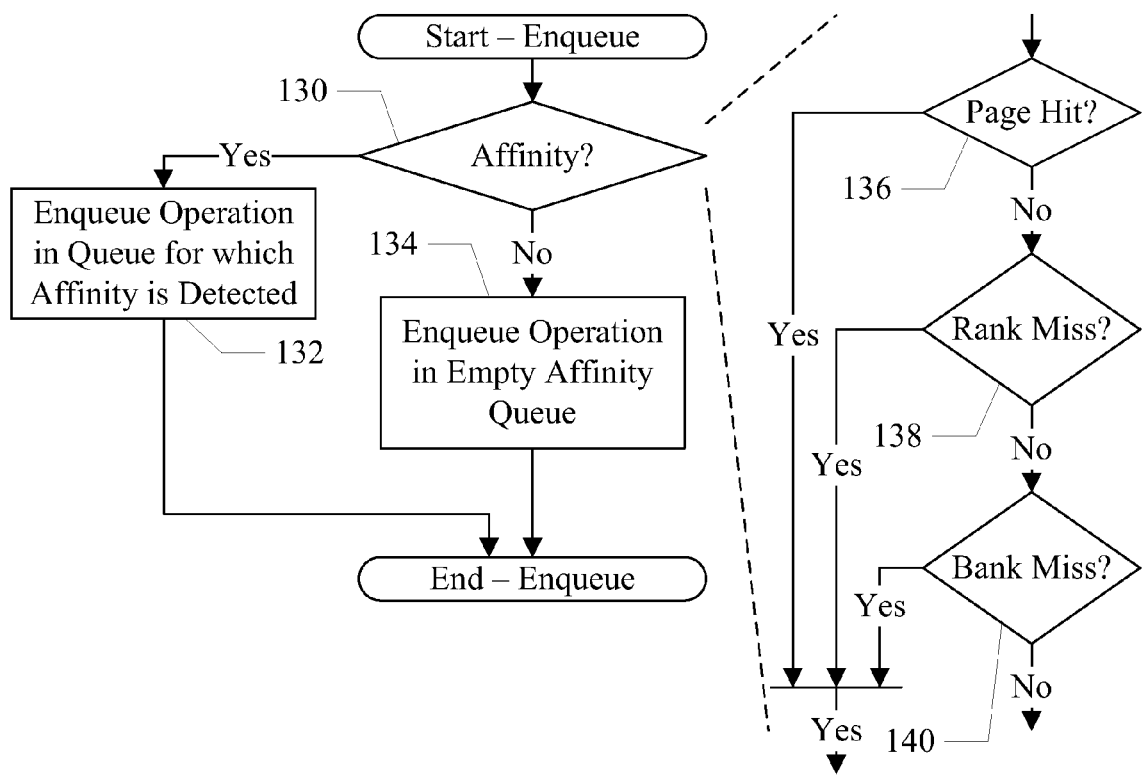
FIG. 8 is a flowchart illustrating operation of one embodiment of an enqueue control unit shown in FIG. 7.

FIG. 8 is a flowchart illustrating operation of one embodiment of the enqueue control unit 110 in response to receive a memory operation. While blocks are shown in a particular order for ease of understanding, other orders may be used. Blocks may be performed in parallel in combinatorial logic in the enqueue control unit 110. Blocks, combinations of blocks, and/or the flowchart as a whole may be pipelined over multiple clock cycles. The enqueue control unit 110 may be configured to implement the operation illustrated in FIG. 8. The enqueue control unit 110 may be configured to implement the operation illustrated in FIG. 8 in parallel for a concurrently-received read operation and write operation.

The enqueue control unit 110 may compare the received operation to the corresponding affinity queues 118A-118B or 120A-120B to determine if the received operation exhibits affinity with the queued operations (decision block 130). In response to detecting affinity (and if there is space in the affinity queue for the operation), the enqueue control unit 110 may enqueue the operation in the affinity queue (block 132). In response to not detecting affinity, the enqueue control unit 110 may enqueue the operation in an empty affinity queue (block 134).

The detection of affinity is shown in exploded view in FIG. 8, for one embodiment. An operation may be affine if it is a page hit with other operations in the affinity queue (decision block 136, "yes" leg), or a bank or rank miss with the other operations (decision blocks 138 and 140, respectively, "yes" legs). If not (decision blocks 136, 138, and 140, "no" legs), the operation is not affine with the queued operations. The detection illustrated by decision blocks 136, 138, and 140 may be performed in parallel for each affinity queue.

Figure 9:
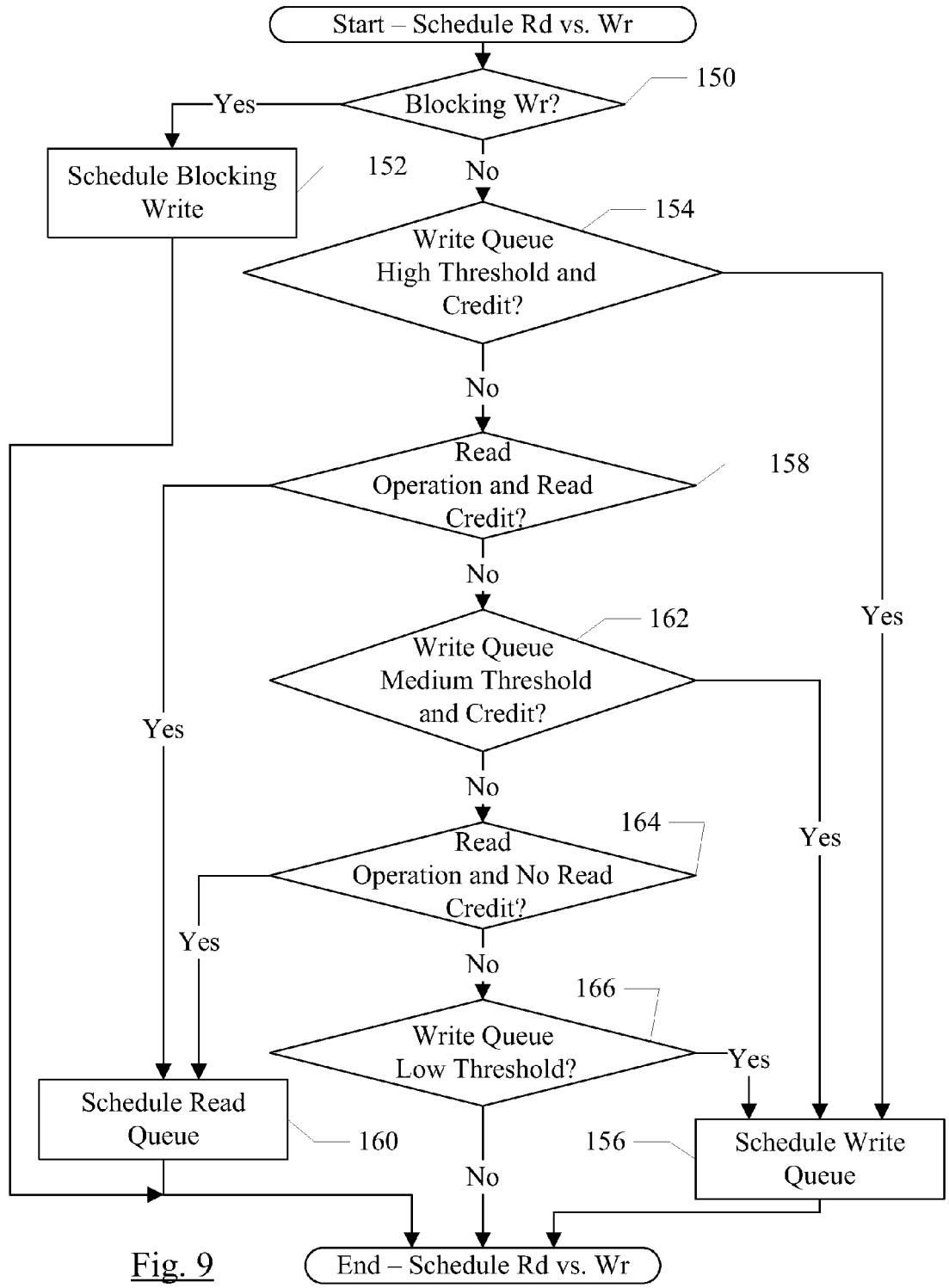
FIG. 9 is a flowchart illustrating operation of one embodiment of a scheduler shown in FIG. 7 to select between reads and writes to be scheduled.

FIG. 9 is a flowchart illustrating operation of one embodiment of the scheduler 114 for scheduling between read operations and write operations in the transaction queues 112. While blocks are shown in a particular order for ease of understanding, other orders may be used. Blocks may be performed in parallel in combinatorial logic in the scheduler 114. Blocks, combinations of blocks, and/or the flowchart as a whole may be pipelined over multiple clock cycles. The scheduler 114 may be configured to implement the operation illustrated in FIG. 9.

In the embodiment of FIG. 9, there are three thresholds for write queue fullness (that is, the number of write operations in the transaction queues 112): high, medium, and low. The high level indicates more write operations in the transaction queues 112 than the medium level indicates, and the medium level indicates more write operations in the transaction queues 112 than the low level indicates. The thresholds may be fixed or programmable, in various embodiments.

The scheduler 114 may be configured to detect a blocking write (decision block 150, "yes" leg), and may be configured to schedule the blocking write (block 152). A blocking write may be a write operation that has the push bit set (indicating that a memory operation having a higher QoS level is ordered behind the write operation). A blocking write operation may also be a write operation that is blocking a read operation to the same address (or the write operation updates at least one byte read by the read operation).

If there are no blocking writes, the scheduling of read operation vs. write operations may be based on a credit system. That is, read operations and write operations may each be assigned a certain number of credits. A scheduled memory operation may consume one credit from the corresponding credit count. In the illustrated embodiment, once the read credits are exhausted and a read operation is scheduled, the credits for both reads and writes may reload by adding the initial credit values to the current counts. Because affine operations may be scheduled in a burst when a read or write operation is scheduled, the credit counts may be reduced below zero. That is, the scheduler 114 may not interrupt a burst of affine operations if the credit count for the operations is reduced to zero. For brevity, the discussion below with respect to FIG. 9 may refer to read operations in the read queue and write operations in the write queue. The read queue may include the combination of the read affinity queues 118A-118B and the write queue may include the combination of the write affinity queues 120A-120B.

Responsive to detecting that the write queue has reached the high threshold and there is at least one write credit available (decision block 154, "yes" leg), the scheduler 114 may be configured to schedule from the write queue (block 156). If the write queue has not reached the high threshold or there are no available write credits (decision block 154, "no" leg), but the scheduler 114 determines that there is at least one read operation in the read queue and there is an available read credit (decision block 158, "yes" leg), the scheduler 114 may be configured to schedule from the read queue (block 160). If there are no read operations in the read queue or there are no available read credits (decision block 158, "no" leg) but the scheduler 114 determines that the write queue has reached the medium threshold and there is an available write credit (decision block 162, "yes" leg), the scheduler may be configured to schedule from the write queue (block 156). If the write queue has not reached the medium threshold or there are no available write credits (decision block 162, "no" leg), but the scheduler 114 determines that there is at least one read operation in the read queue and there is no available read credit (decision block 164, "yes" leg), the scheduler 114 may be configured to schedule from the read queue (block 160). As mentioned previously, the scheduler 114 may be configured to reload read and write credits in this instance as well. If there is no read operation in the read queue (decision block 164, "no" leg) and the scheduler 114 determines that the write queue has reached the low threshold (decision block 166, "yes" leg), the scheduler 114 may be configured to schedule from the write queue (block 156).

While the flowchart of FIG. 9 illustrates not scheduling from the write queue until the write queue reaches the low threshold, some embodiments may schedule from the write queue if the scheduler 114 has been idle for a period of time. The period of time may be fixed or programmable.

FIG. 10 is a block diagram illustrating operation of one embodiment of the scheduler 114 to implement scheduling from the write queue (block 156). As illustrated in FIG. 10, the scheduler 114 may be configured to schedule the write affinity queue 120A-120B having the largest number of write operations (block 168).

FIG. 11 is a table illustrating various states that the scheduler 114 may be in to schedule read operations from the read queue (block 160). The states are illustrated in increasing order of priority. Thus, if more than one entry in the table of FIG. 11 would correspond to the contents of the read queue, the entry with the highest priority may be the state of the scheduler 114. The scheduler 114 may be configured to schedule operations as illustrated in the "schedule" column of FIG. 11 for the corresponding state.

The table of FIG. 11 may refer to the number of reads in the read queue being above or below a green or yellow threshold. The green and yellow thresholds may be different from the RTG and RTY QoS levels, and may be similar to write queue thresholds discussed above. The green and yellow thresholds may be fixed or programmable. Additionally, an affinity group may be referred to as being scheduled. An affinity group may be the group of operations in one of the read affinity queues 118A-118B.

The scheduler read state may be green if the number of reads in the read queue is below the yellow threshold (and has not been above the yellow threshold since entering the green state), and if there are no RTY or RTR reads in the queue. In the green state, the scheduler 114 may be configured to schedule an LLT read operation, if any. The operations in the read affinity queue with the LLT read operation may also be scheduled, if any. If there are no LLT read operations, the affinity group having the oldest read operation may be scheduled.

The scheduler read state may be LLT yellow if the number of reads is above the green threshold (or has not fallen below the green threshold since the LLT yellow state was entered) and there are no RTR or RTY read operations in the read queue. In the LLT yellow state, the scheduler 114 may be configured to schedule LLT read operations, if any. If there are no LLT read operations, the scheduler 114 may be configured to schedule the largest affinity group in the read queue. In an embodiment, the scheduler 114 may be programmable to schedule the affinity group containing the oldest read operation if there are no LLT read operations in the LLT yellow state, similar to the green state.

The scheduler read state may be yellow if there is at least one RTY read operation but no RTR operations. In the yellow state, the scheduler 114 may be configured to scheduling the affinity group that includes the oldest RTY read operation, or the largest affinity group.

The scheduler read state may be red affinity if there is at least one RTR read operation in the queue and the scheduler 114 is programmed to associate affinity operations with RTR operations. In the red affinity state, the scheduler 114 may be configured to schedule the affinity group that includes the oldest RTR operation. Otherwise, the largest affinity group may be scheduled.

The scheduler read state may be red if the there is at least one RTR read operation in the queue and the scheduler 114 is programmed to schedule RTR read operations without their affine operations. In the red state, the scheduler 114 may be configured to schedule the oldest RTR read operation, or the largest affinity group.

The above discussion has referred to reads in the read queue as being "oldest." In some embodiments, read operations may be viewed as oldest based on time spent in the read queue. In other embodiments, age may be measured in other ways. For example, the oldest read operation may be measured in terms of the number of times the read operation has not been scheduled in favor of another read operation.

When an affinity group is scheduled, the number of memory operations scheduled from the affinity group may be the number of operations in the group up to a fixed or programmable burst size. In an embodiment, if a currently scheduled affinity group has fewer operations than the burst size, other memory operations may be scheduled. The scheduler 114 may, for example, schedule "stragglers" (e.g. memory operations that were part of an affinity group that was previously scheduled but terminated due to burst size) that may be affine with the currently scheduled affinity group. Alternatively, the scheduler 114 may be configured to select the next largest affinity group.

Figure 12:
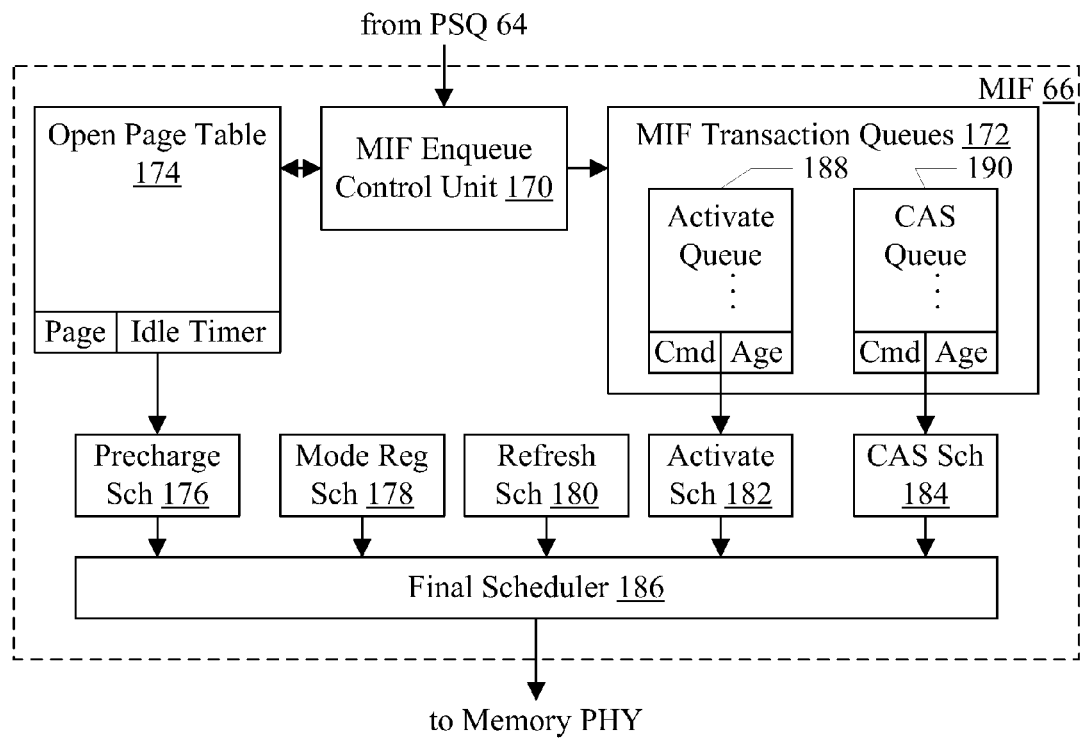
FIG. 12 is a block diagram of one embodiment of a memory interface (MIF) unit shown in FIG. 3.

Turning now to FIG. 12, a block diagram of one embodiment of the MIF 66 is shown. In the embodiment of FIG. 12, the MIF 66 includes an MIF enqueue control unit 170, MIF transaction queues 172, an open page table 174, a precharge scheduler 176, a mode register (reg) scheduler 178, a refresh scheduler 180, an activate scheduler 182, a column address strobe (CAS) scheduler 184, and a final scheduler 186. The MIF enqueue control unit 170 is coupled to receive a memory operation from the PSQ 64, and is coupled to the open page table 174 and the MIF transaction queues 172. The open page table 174 is coupled to the precharge scheduler 176. The MIF transaction queues 172 include an activate queue 188 and a CAS queue 190 which are coupled to the activate scheduler 182 and the CAS scheduler 184, respectively. The schedulers 176, 178, 180, 182, and 184 are coupled to the final scheduler 186, which is coupled to transmit a command to one of the memory PHYs 42A or 42B depending on whether the MIF 66 is instantiated in the MCU 56A or 56B.

The MIF enqueue control unit 170 may be configured to compare the received memory operation to the open page table 174 and the MIF transaction queues 172, and may be configured to presynthesize commands to perform the memory operation. Particularly, if the page corresponding to the received memory operation will be opened by a queued activate command, the received memory operation may be queued as a CAS operation. If the page corresponding to the received memory operation is already open and there are no queued page-conflict activates, the received memory operation may be queued as a CAS operation. If the page corresponding to the received memory operation is not open, the memory operation may be queued as an activate command and a CAS command. Each command may be assigned an age counter (age field in the activate queue 188 and the CAS queue 190). The value of the age counter may be based on the QoS parameter of a read memory operation, and may be shorter for higher QoS levels than for lower QoS levels. For write memory operations, the age counter may be the same as the lowest QoS level for read memory operations, or may be longer than the lowest QoS level. Age may be counted as a number of operations which bypass the operation, or as a number of clock cycles, in various embodiments. Once an age counter is reduced to zero, the corresponding operation may be scheduled as the highest priority in the MIF 66.

The activate scheduler 182 and the CAS scheduler 184 may be configured to schedule activate commands and CAS commands from the corresponding queues 188 and 190. The activate command may open a page in the memory and the CAS command may cause a read or a write of data within the page.

The precharge scheduler 176 may be configured to schedule a precharge command for a bank when the idle timer for the page in the open page table 174 expires. The idle timer may be reloaded each time a received memory operation hits in the open page, and may be decremented each clock cycle or for each memory operation which does not hit in the open page. In cases in which a page conflict with a newly received memory operation causes a page to be closed, the last CAS command to the previous page may be used to precharge the bank.

The mode reg scheduler 178 may be configured to generate memory register read (MRR) and memory register write (MRW) commands according to configurable timers and/or in response to memory timer requests. The refresh scheduler 180 may generate refresh commands when refresh is needed.

The final scheduler 186 may select among the schedulers 176, 178, 180, 182, and 184 to schedule a command to the memory PHY circuit. The scheduler 186 may also enforce certain protocols such as the turnaround cycle between read and write operations, etc.

It is noted that the activate and CAS queues 188 and 190 may be virtual. That is, the same entry in the MIF transaction queues 172 may be used for both the activate and the CAS command for a given memory operation. If an activate is needed for the given memory operation, the entry may be initialized as an activate command and may be converted to a CAS command once the activate is issued. If an activate is not needed for the given memory operation, the entry may be initialized as a CAS command.

It is further noted that, in addition to the circuitry illustrated in FIGS. 7 and 12, there may be a data path (not shown) in the MCUs 56A-56B to transport write data from the AIU 54 to the memory and to transport read data from the memory to the AIU 54.

Figure 13:
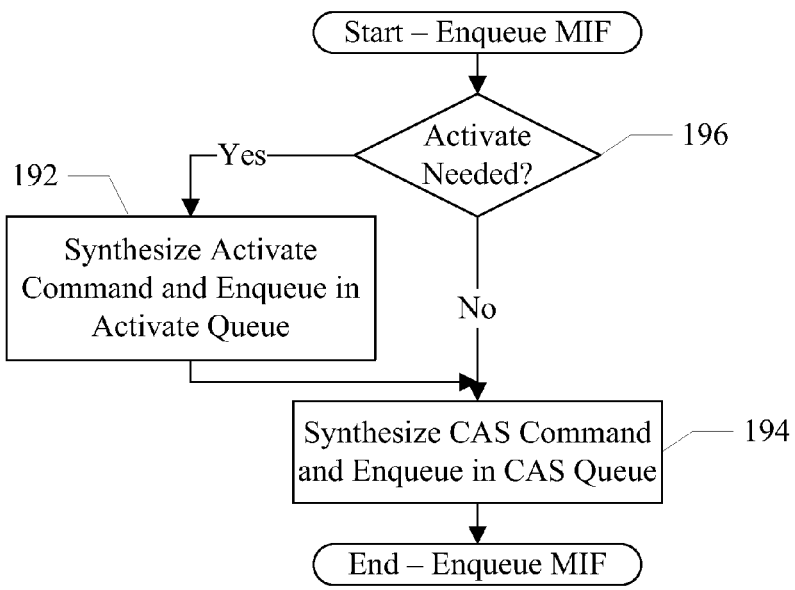
FIG. 13 is a flowchart illustrating operation of one embodiment of an MIF enqueue control unit shown in FIG. 12.

FIG. 13 is a flowchart illustrating operation of one embodiment of the MIF enqueue control unit 170 in response to a memory operation from the PSQ 64. While blocks are shown in a particular order for ease of understanding, other orders may be used. Blocks may be performed in parallel in combinatorial logic in the MIF enqueue control unit 170. Blocks, combinations of blocks, and/or the flowchart as a whole may be pipelined over multiple clock cycles. The MIF enqueue control unit 170 may be configured to implement the operation illustrated in FIG. 13.

The MIF enqueue control unit 170 may be configured to determine if an activate command is needed for the received memory operation (e.g. the memory operation does not hit an open page or a page that will be opened by a previously queued activate command) (decision block 196). If so (decision block 196, "yes" leg), the MIF enqueue control unit 170 may be configured to synthesize an activate command and enqueue the activate command in the activate queue 188 (block 192). The MIF enqueue control unit 170 may also be configured to synthesize a CAS command and enqueue the CAS command in the CAS queue 190 (block 194). In each case, the age counter may be initialized (based on the QoS parameter for reads).

FIG. 14 is a flowchart illustrating operation of one embodiment of the activate scheduler 182. The activate scheduler 182 may be configured to scan the activate commands in the activate queue 188 for an activate command that has aged out (e.g. it's age counter is zero). If such an activate command is detected, the activate may select the aged out activate command (block 200). Otherwise, the activate scheduler 182 may select the activate command in the head cluster that is in the bank having the most pending operations. The head cluster may be the group of activates of the same read/write type that are the oldest activate commands in the activate queue 188. If more than one activate command qualifies, the oldest qualifying activate command may be selected.

FIG. 15 is a flowchart illustrating operation of one embodiment of the CAS scheduler 184. While blocks are shown in a particular order for ease of understanding, other orders may be used. Blocks may be performed in parallel in combinatorial logic in the CAS scheduler 184. Blocks, combinations of blocks, and/or the flowchart as a whole may be pipelined over multiple clock cycles. The CAS scheduler 184 may be configured to implement the operation illustrated in FIG. 15.

Like the activate scheduler 182, the CAS scheduler 184 may be configured to detect aged-out CAS commands and select those for transmission first (decision block 202, "yes" leg and block 204). If there are no aged-out CAS commands (decision block 202, "no" leg) and the most recent CAS command was a read (decision block 206, "yes" leg), the CAS scheduler 184 may be configured to select the next read CAS command to the same rank as the last CAS command or to select the read CAS command with the most conflicting operations waiting for the CAS command to complete so that the page can be closed (block 208). Similarly, if the last CAS command was a write (decision block 206, "no" leg and decision block 210, "yes" leg), the CAS scheduler 184 may be configured to select the next write CAS command to the same rank as the last CAS command or to select the write CAS command with the most conflicting operations waiting for the CAS command to complete so that the page can be closed (block 212). If none of the above apply, the CAS scheduler 184 may be configured to select the oldest CAS command in the CAS queue 190 (block 214). It is noted that, in blocks 204, 208, 212, and 214, if more than one CAS command qualifies, the oldest CAS command may be selected.

FIG. 16 is a table illustrating operation of one embodiment of the final scheduler 186. The entries in the table are illustrated in decreasing priority from top to bottom. If a burst stop (BST) command or an interrupt CAS command is to be transmitted, these commands may be given highest priority. Next may be a command from the mode reg scheduler 178, followed by an auto-refresh command from the refresh scheduler 180. A CAS command from the CAS scheduler 184 may be next in priority to the auto-refresh command, then the activate command from the activate scheduler 182. A precharge command from the precharge scheduler 176 may follow the activate command in priority, and lowest in priority in FIG. 16 may be the self-refresh command used to enter a low power mode.

Figure 17:
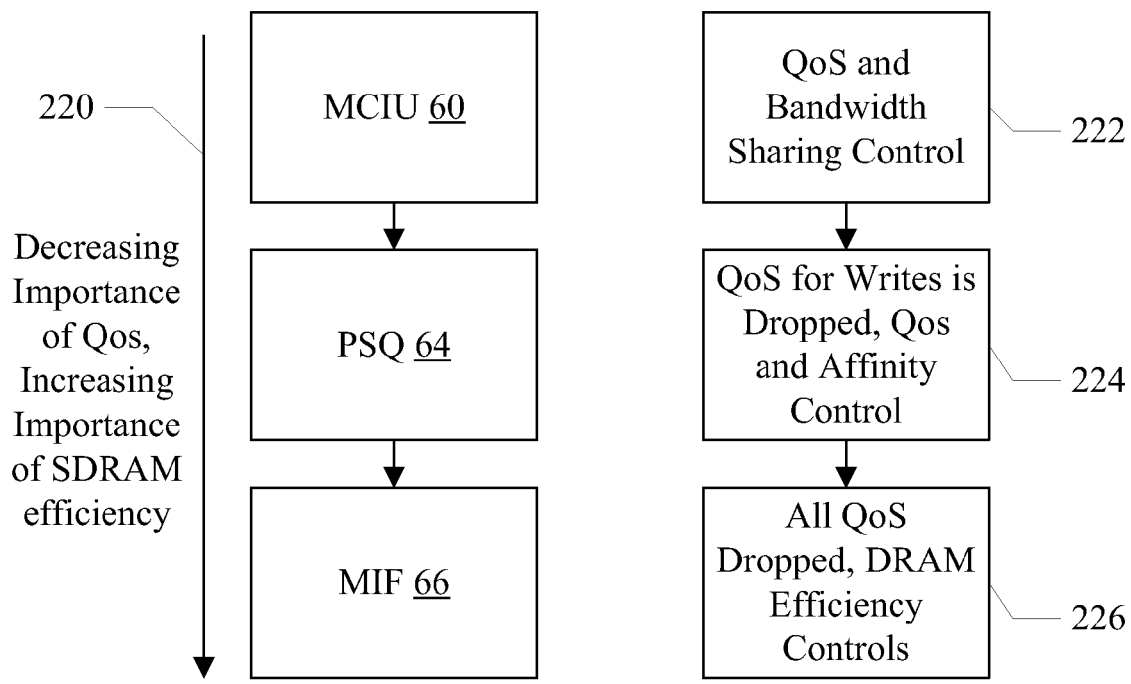
FIG. 17 is a block diagram of one embodiment of queuing at a high level and relative importance of QoS parameters and memory bandwidth optimization in scheduling at the various levels.

As discussed briefly above, a memory operation may enter the memory controller 40 from a source with a high importance placed on the QoS level of the memory operation. As the memory operation is processed in the memory controller 40 and approaches transmission to the memory, the importance of the QoS level may decrease and the importance of memory (SDRAM) efficiency may increase. FIG. 17 illustrates this operation diagrammatically. The MCIU 60 (e.g. 60A or 60B), the PSQ 64, and the MIF 66 are illustrated, along with blocks illustrating the scheduling controls at each level. At the MCIU 60, the QoS levels of both read and write operations, along with the bandwidth sharing parameters, may control the selection of read and write operations for transmission to the PSQ 64. Memory efficiency may not be considered at this level (block 222). At the PSQ 64, the QoS for writes is dropped. Affinity controls the selection of writes, and a combination of QoS and affinity may primarily control the selection of reads (block 224). Accordingly, QoS and memory efficiency concerns may be more balanced at this PSQ 64. At the MIF 66, the QoS is dropped for all memory operations (although QoS may be reflected in aging parameters), and SDRAM efficiency concerns may primarily control the selection of commands (block 226).

Also as discussed briefly above, the memory controller 40 may support the upgrade of the QoS level of pending memory operations. Various embodiments may support one or more mechanisms to signal an upgrade of the QoS level: in-band, side band, and aging.

Figure 18:
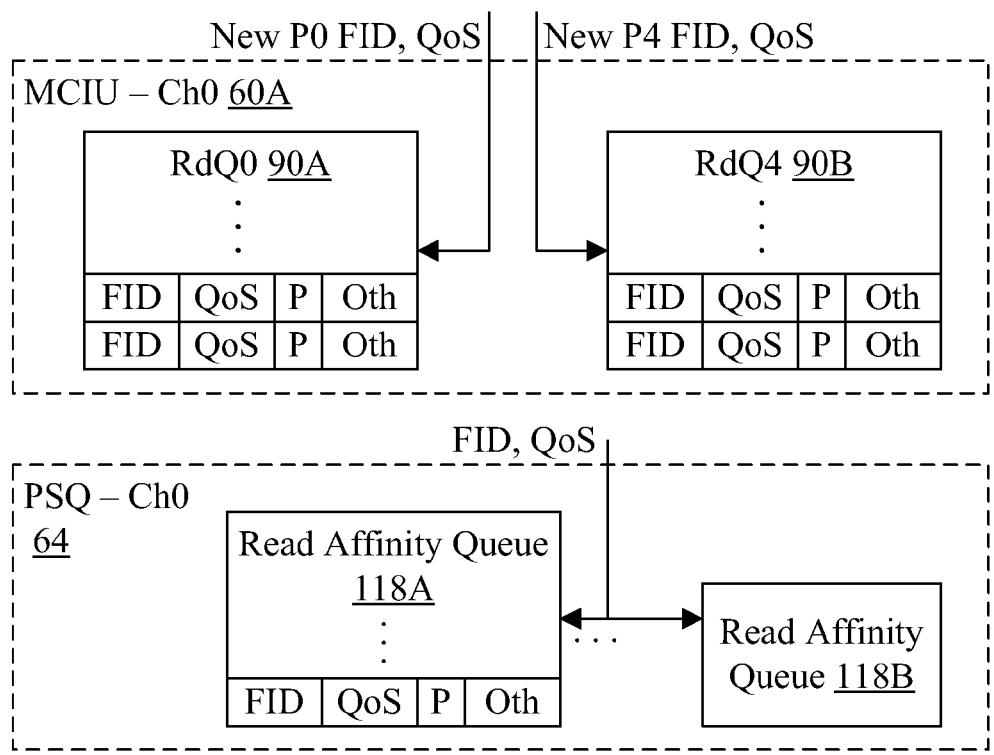
FIG. 18 is a block diagram of one embodiment of memory controller features to support in-band QoS upgrade.

FIG. 18 is a block diagram illustrating one embodiment of the in-band QoS upgrade mechanism. In this mechanism, receiving a memory operation in the same flow as a previous memory operation, and the newly-received memory operation having a higher QoS level than the previous memory operation, may cause the memory controller 40 to upgrade the QoS level of the previous memory operation. A portion of the MCIU 60A is illustrated, along with a portion of the PSQ 64 in the MCU 56A. The MCIU 60B and the PSQ 64 in the MCU 56B may be similar.

The MCIU 60A may receive memory operations from each port as previously discussed, and may queue the newly received memory operations in one of the queues 90A-90B or 92A-92B for reads and writes, respectively. Additionally, as illustrated in FIG. 18, the MCIU 60A may compare the FID and QoS parameters of the newly received memory operation to the corresponding values of the queued memory operations from the same port (e.g. the RdQ0 90A may compare the FID and QoS parameters of the newly received memory operation on port 0, or G0 port 44A, and the RdQ4 90B may compare the FID and QoS parameters for the newly received memory operation on port 4, or the RT port 44E). In response to a newly received memory operation from the same port and flow having a higher QoS level as a queued memory operation, the MCIU 60A may upgrade the QoS level of the queued memory operation to the higher QoS level. In some embodiments, QoS upgrade may be limited to certain ports. For example, one embodiment may limit QoS upgrade to the RT port 44E. Other embodiments may limit the QoS upgrade to ports on which RT traffic may be received. In such embodiments, only the newly received memory operations from the ports for which upgraded is supported may be compared.

Similarly, FID and QoS parameters may be received by the read affinity queues 118A-118B in the PSQ 64. The PSQ 64 may upgrade the QoS level of a queued read operation in response to a newly received memory operation from the same port and flow that has a higher QoS level. In some embodiments, the FID and QoS parameters received by the PSQ 64 may be the same newly-received FID and QoS parameters as those received by the MCIU 60A. That is, the PSQ 64 and the MCIU 60A may upgrade QoS levels in parallel for each newly received memory operation. In other embodiments, the MCIU 60A may perform QoS upgrade in response to the newly received memory operation, and the PSQ 64 may perform QoS upgrade in response to a memory operation being transmitted from the MCIU 60A to the PSQ 64.

While FIG. 18 illustrates comparing FID and QoS parameters to the read queues 90A-90B, comparison may also be made to the write queues 92A-92B to upgrade the QoS parameters. As discussed previously, however, the QoS parameters for write operations may be dropped in the PSQ 66, and thus there may be no comparison to the write affinity queues 120A-120B in such embodiments.

Figure 19:
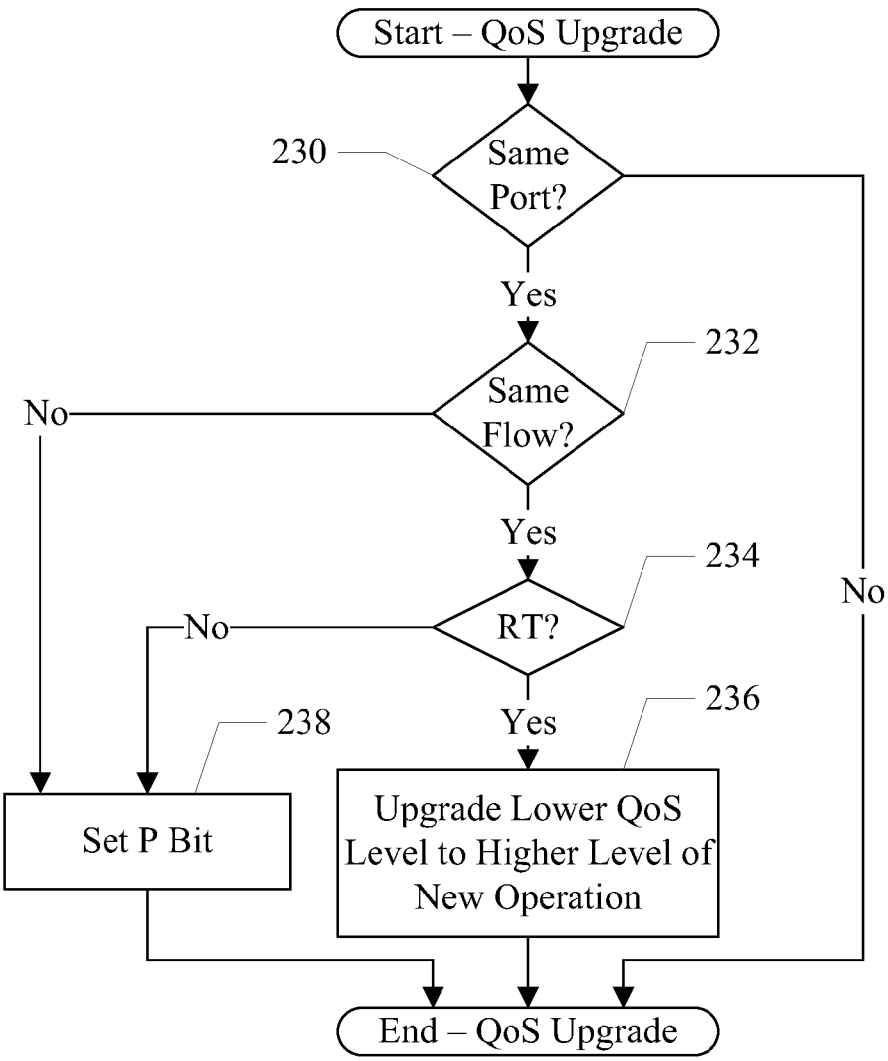
FIG. 19 is flowchart illustrating operation of one embodiment of in-band QoS upgrade.

FIG. 19 is a flowchart illustrating operation of one embodiment of the memory controller 40 to upgrade QoS levels for the in-band upgrade mechanism. While the blocks are shown in FIG. 19 in a particular order for ease of understanding, other orders may be used. Blocks, combinations of blocks, and/or the flowchart as a whole may be pipelined over multiple clock cycles. The memory controller 40 may be configured to implement the operation in FIG. 19. More particularly, each of the PSQ 64 and the MCIUs 60A-60B may include upgrade circuitry configured to implement the operation shown in FIG. 19.

If a newly received memory operation is from the same port as a queued memory operation (decision block 230, "yes" leg), from the same flow as indicated by the FID (decision block 232, "yes" leg), and the queued memory operation is an RT memory operation (decision block 234, "yes" leg), the memory controller 40 may upgrade the QoS level of the queued operation to the higher QoS level of the newly received memory operation (block 236). In one embodiment, the queues in which QoS upgrade is supported may include content addressable memories to perform the compare, and a match may enable a write of the newly-received QoS parameter to the matching queue entry.

If the newly received memory operation is from the same port and flow as a queued memory operation (decision blocks 230 and 232, "yes" legs), but the queue memory operation is not an RT memory operation (decision block 234, "no" leg), the memory controller 40 may be configured to set the P bit for the queued memory operation (block 238). Similarly, if the newly received memory operation is from the same port but a different flow as a queued memory operation (decision block 230, "yes" leg and decision block 232, "no" leg), the memory controller 40 may be configured to set the P bit for the queued memory operation (block 238).

Figure 20:
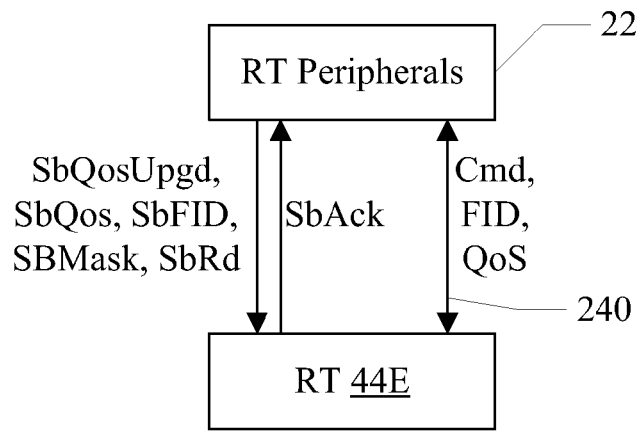
FIG. 20 is a block diagram of one embodiment of a sideband QoS upgrade interface.

FIG. 20 is a block diagram illustrating the addition of a sideband interface to request a QoS upgrade. In the embodiment of FIG. 20, the sideband interface is included for the RT port 44E. Other embodiments may implement one or more additional sideband interfaces for other ports. As the name implies, the sideband interface may be in addition to the "regular" interface for transmitting memory operations to the memory controller 40. The regular interface (including the Cmd, FID, and QoS parameter as shown in FIG. 1) is illustrated via arrow 240. The sideband interface may include a sideband QoS upgrade request signal (SbQoSUpgd), a sideband QoS parameter (SbQoS), a sideband FID (SbFID), a sideband mask (SbMask), and a sideband read indication (SbRd) from the RT peripherals 22 to the RT port 44E, and a sideband acknowledge (SbAck) from the RT port 44E to the RT peripherals 22.

The RT peripherals 22 may assert the SbQoSUpgd signal to request a sideband upgrade, and may supply the QoS parameter representing the upgraded QoS level on the SbQoS. The SbFID may identify the flow, and the SbMask may provide for generality by permitting a portion of the SbFID and the queued FIDs to be masked in the comparison. The SbRd indicator may indicate if reads or writes are to be compared for upgrade. The RT port 44E may acknowledge the upgrade request using the SbAck. In one embodiment, the hardware within the memory controller 40 to perform the sideband upgrade may be similar to that shown in FIG. 18, and the process maybe similar to that shown in FIG. 19. The newly received memory operation may be replaced in the above description by the sideband request being received.

Figure 21:
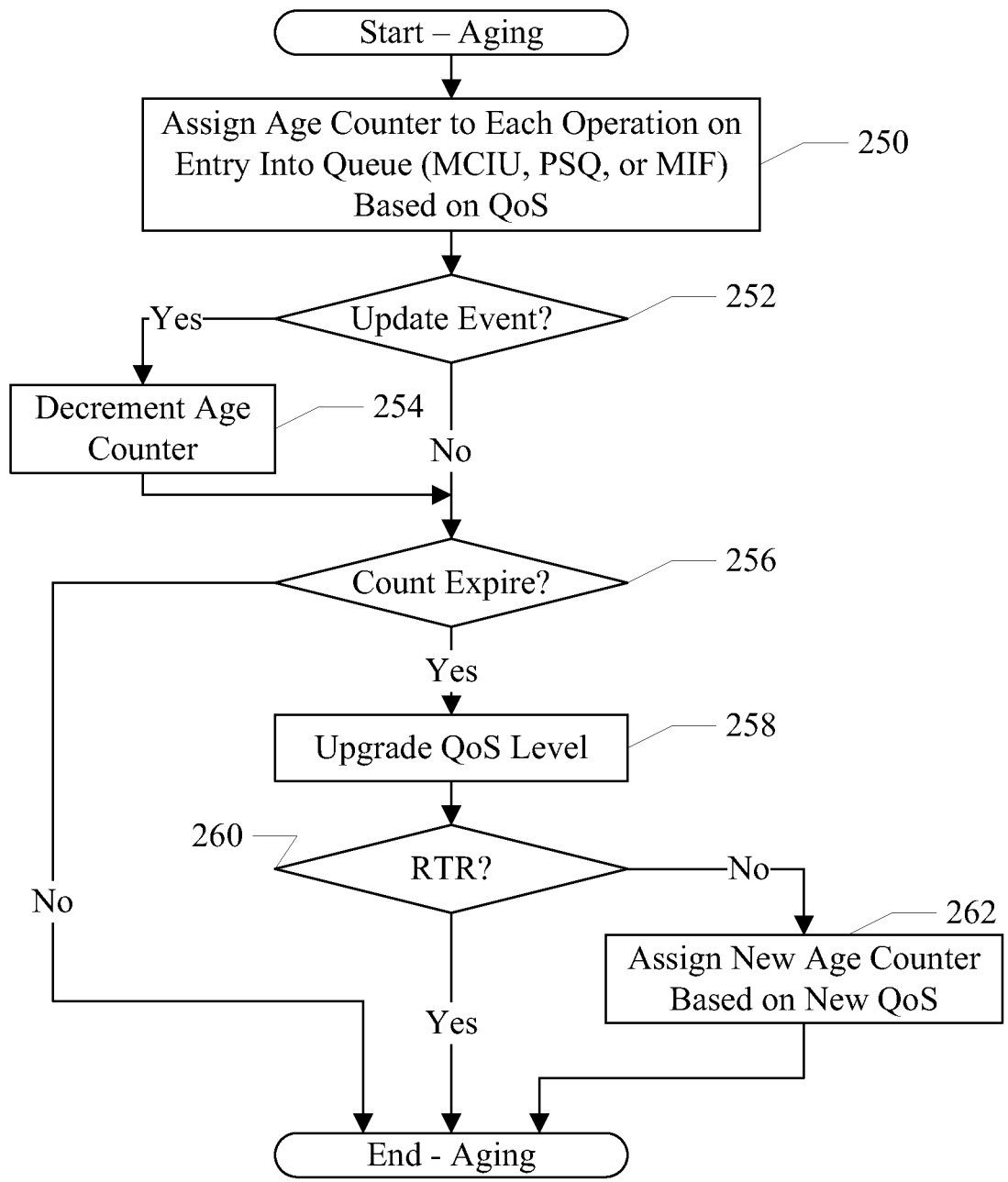
FIG. 21 is a flowchart illustrating one embodiment of QoS upgrade due to aging of operations.

FIG. 21 is a flowchart illustrating generalized operation of the memory controller 40 for implementing aging-based QoS upgrade. As mentioned previously, the MIF transaction queues 172 may implement priority upgrade based on aging. Other embodiments may similarly implement aging-based QoS upgrades. While the blocks are shown in a particular order in FIG. 21 for ease of understanding, other orders may be used. Blocks may be performed in parallel in combinatorial logic in the memory controller 40. Blocks, combinations of blocks, and/or the flowchart as a whole may be pipelined over multiple clock cycles. Updating the age counters and upgrading the corresponding memory operations may be performed in parallel for each operation.

The memory controller 40 may assign an age counter to each memory operation upon entry of the operation into a queue (e.g. the MCIU queues 90 or 92, the PSQ transaction queues 112, and/or the MIF transaction queues 172) (block 250). The aging counters may be different in each queue and need not be carried from queue to queue. Alternatively, an aging counter may be assigned at the MCIU and carried through the other queues. The initial value of the aging counter may be based on the QoS parameter of each memory operation (e.g. shorter values for higher QoS values). The initial values may be fixed or programmable.

The memory controller 40 may detect an update event that updates a given aging counter (decision block 252). The update event may vary depending on how the aging counter is measured. For example, some embodiments may measure age in terms of a number of times a memory operation is bypassed by a younger memory operation. In such embodiments, the update event may be the bypassing of the memory operation. Other embodiments may count clock cycles as age, and the update event may be the rising or falling edge of the clock. Still other embodiments may define age in other ways, and the update event may be detected accordingly. In response to detecting the update event (decision block 252, "yes" leg), the memory controller 40 may decrement the age counter (block 254).

The memory controller 40 may be configured to detect whether or not a given age counter has expired (decision block 256). If so (decision block 256, "yes" leg), the memory controller 40 may be configured to upgrade the QoS level to the next higher level in the same set of QoS levels (block 258). If the upgraded QoS level is not the highest level (e.g. RTR, decision block 260, "no" leg), the memory controller 40 may assign a new age counter value based on the new QoS level for further aging-based upgrade (block 262). Accordingly, in this embodiment, the QoS level of a memory operation may be upgraded through each intervening QoS level to the highest QoS level as the memory operation ages.

Figure 22:
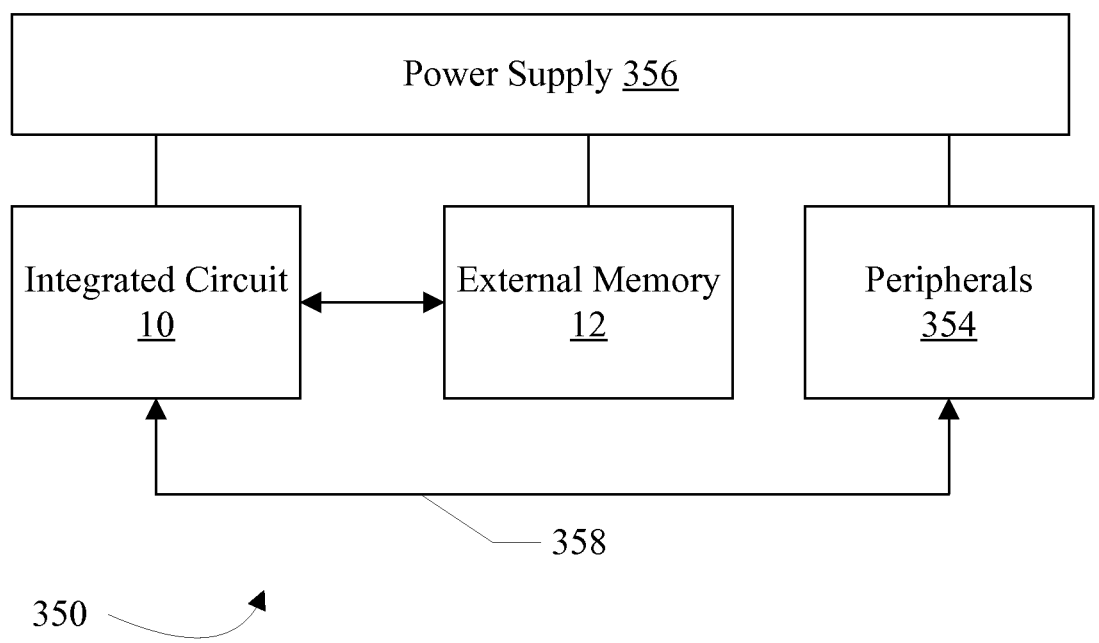
FIG. 22 is a block diagram of one embodiment of a system including an integrated circuit illustrated in FIG. 1.

Turning next to FIG. 22, a block diagram of one embodiment of a system 350 is shown. In the illustrated embodiment, the system 350 includes at least one instance of the integrated circuit 10 coupled to external memory 12 (e.g. the memory 12A-12B in FIG. 1). The integrated circuit 10 is coupled to one or more peripherals 354 (e.g. via signal lines 358) and the external memory 12. A power supply 356 is also provided which supplies the supply voltages to the integrated circuit 10 as well as one or more supply voltages to the memory 12 and/or the peripherals 354. In some embodiments, more than one instance of the integrated circuit 10 may be included (and more than one external memory 12 may be included as well).

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. A method comprising:
   receiving a plurality of memory operations in a memory controller, wherein each memory operation of the plurality of memory operations has an associated quality of service (QoS) parameter indicating a requested quality of service for performance of the memory operation to a memory controlled by the memory controller; and
   grouping the plurality of memory operations into a plurality of affinity groups, wherein the memory operations within a given affinity group consume less memory bandwidth when scheduled as a group than when scheduled separately, and wherein the memory controller comprises a plurality of memory channel controllers, wherein each memory channel controller is configured to control an independent memory channel to the memory, and each memory channel controller independently grouping memory operations into affinity groups from the memory operations within a corresponding memory channel; and
   scheduling memory operations directed to each memory channel of the plurality of memory channels by each memory channel controller, wherein the scheduling in a given memory channel by a given memory channel controller is responsive to the QoS parameters associated with the memory operations in the given memory channel, a state of the memory controller, and sizes of the plurality of affinity groups in the given memory channel.

2. The method as recited in claim 1 wherein the grouping comprises grouping ones of the plurality of memory operations that are page hits with each other into one of the plurality of affinity groups.

3. The method as recited in claim 1 wherein the grouping comprises grouping ones of the plurality of memory operations that are bank misses with each other into one of the plurality of affinity groups.

4. The method as recited in claim 1 wherein the grouping comprises grouping ones of the plurality of memory operations that are rank misses with each other into one of the plurality of affinity groups.

5. The method as recited in claim 1 wherein the scheduling comprises prioritizing larger affinity groups over smaller affinity groups.

6. The method as recited in claim 5 wherein the scheduling further comprises prioritizing a first affinity group having an oldest memory operation with a selected QoS parameter over other affinity groups, wherein the selected QoS parameter is determined responsive to a state of the memory controller.

7. The method as recited in claim 6 wherein the QoS parameter is eliminated for write memory operations, and wherein write affinity groups of the plurality of affinity groups are scheduled based on size of the affinity groups only.

8. The method as recited in claim 6 wherein the scheduling further comprises scheduling a largest affinity group of the plurality of affinity groups responsive to no affinity groups of the plurality of affinity groups having the selected QoS parameter.

9. A memory controller in an integrated circuit (IC), the memory controller comprising:
   an agent interface unit coupled to receive memory operations input to the memory controller from a plurality of sources within the IC, wherein each received memory operation includes a quality of service (QoS) parameter indicating a requested quality of service for performance of the received memory operation to a memory controlled by the memory controller; and
   a plurality of memory channel units, wherein each memory channel unit is configured to control an independent memory channel in a memory coupled to the IC and controlled by the memory controller, wherein the agent interface unit is configured to schedule the received memory operations to the plurality of memory channel units responsive to an address accessed by each received memory operation, and wherein each of the plurality of memory channel units is configured to group memory operations received from the agent interface unit into affinity groups, wherein the memory operations within a given affinity group consume less memory bandwidth when scheduled as a group than when scheduled separately, and wherein each of the plurality of memory channel units is configured to schedule the memory operations to access a memory responsive to a size of the affinity groups and further responsive to the QoS parameters of the memory operations, and wherein each of the plurality of memory channel units is configured to group memory operations into affinity groups and to schedule the memory operations independent of other ones of the plurality of memory channel units.

10. The memory controller as recited in claim 9 wherein each of the plurality of memory channel units is configured to prioritize larger affinity groups over smaller affinity groups for scheduling.

11. The memory controller as recited in claim 10 wherein each of the plurality of memory channel units is configured to schedule a first affinity group having an oldest memory operation with a selected QoS parameter, wherein the selected QoS parameter is determined responsive to a state of the memory controller.

12. The memory controller as recited in claim 11 wherein each of the plurality of memory channel units are configured to eliminate the QoS parameter for write memory operations, and wherein write affinity groups are scheduled based on size of the affinity groups only.

13. The memory controller as recited in claim 11 wherein each of the plurality of memory channel units are configured to schedule a largest affinity group responsive to no affinity groups of the plurality of affinity groups having the selected QoS parameter.

14. An apparatus for a memory controller in an integrated circuit (IC), the apparatus comprising:
   a plurality of transaction queues configured to store memory operations from a plurality of sources within the IC and associated quality of service (QoS) parameters, wherein a given QoS parameter indicates a requested quality of service for performance of a corresponding memory operation in a memory to which the integrated circuit is coupled;

an enqueue control unit coupled to the plurality of transaction queues and configured to enqueue memory operations into the plurality of transaction queues, wherein the enqueue control unit is configured to group the memory operations into affinity queues in the plurality of transaction queues, wherein the memory operations within a given affinity group consume less memory bandwidth when scheduled as a group than when scheduled separately; and a scheduler coupled to the plurality of transaction queues and configured to schedule memory operations for transmission on a memory channel responsive to the affinity queues and further responsive to the QoS parameters, wherein the memory channel is one of a plurality of memory channels in a memory coupled to the memory controller, wherein each channel includes independent affinity queues, transaction queues, and schedulers.

15. The apparatus as recited in claim 14 wherein the affinity queues are virtual queues within the plurality of transaction queues.

16. The apparatus as recited in claim 14 wherein the enqueue control circuit is configured to group memory operations that are page hits, rank misses, or bank misses into an affinity queue.

17. The apparatus as recited in claim 14 wherein the scheduler is configured to favor affinity queues that are more full than other affinity queues in the scheduling.

18. The apparatus as recited in claim 17 wherein the scheduler is configured to favor affinity queues having at least one memory operation that includes a given QoS parameter.

19. The apparatus as recited in claim 18 wherein the given QoS parameter is selected responsive to a state of the memory controller.

* * * * *